US008860977B2

(12) United States Patent
Oki

(10) Patent No.: US 8,860,977 B2
(45) Date of Patent: Oct. 14, 2014

(54) INFORMATION TRANSMISSION SYSTEM AND METHOD WITH MULTIPLE USER AUTHENTICATION

(71) Applicant: Makoto Oki, Toyokawa (JP)
(72) Inventor: Makoto Oki, Toyokawa (JP)
(73) Assignee: Konica Minolta Business Technologies, Inc., Chiyoda-Ku, Tokyo (JP)
(*) Notice: Subject to any disclaimer, the term of this patent is extended or adjusted under 35 U.S.C. 154(b) by 87 days.
(21) Appl. No.: 13/721,122
(22) Filed: Dec. 20, 2012
(65) Prior Publication Data
US 2013/0169989 A1 Jul. 4, 2013

(30) Foreign Application Priority Data

Dec. 28, 2011 (JP) ................................ 2011-289152

(51) Int. Cl.
G06K 15/00 (2006.01)
G06F 3/12 (2006.01)
G06F 21/30 (2013.01)
G06F 21/31 (2013.01)
(52) U.S. Cl.
CPC ...... *G06F 3/12* (2013.01); *G06F 21/31* (2013.01); *G06F 21/30* (2013.01); *G06F 3/1204* (2013.01); *G06F 3/1261* (2013.01); *G06F 3/1291* (2013.01)
USPC ........................................ 358/1.14; 358/1.15
(58) Field of Classification Search
CPC ....... G06F 3/12; G06F 3/1204; G06F 3/1261; G06F 3/1291; G06F 21/30; G06F 21/31
USPC ................................. 358/1.14, 1.15
See application file for complete search history.

(56) References Cited

U.S. PATENT DOCUMENTS

| 5,608,494 | A | 3/1997 | Ogura et al. | |
|---|---|---|---|---|
| 7,367,044 | B2 * | 4/2008 | Fowler et al. | 726/1 |
| 7,908,642 | B2 * | 3/2011 | Rubio et al. | 726/2 |
| 8,164,771 | B2 * | 4/2012 | Hikichi et al. | 358/1.15 |
| 2005/0111013 | A1 | 5/2005 | Maekawa | |
| 2005/0128505 | A1 | 6/2005 | Shirai et al. | |
| 2009/0257078 | A1* | 10/2009 | Sawada et al. | 358/1.14 |

FOREIGN PATENT DOCUMENTS

| JP | 06-102717 | A | 4/1994 |
|---|---|---|---|
| JP | 2005-156762 | A | 6/2005 |
| JP | 2005-173920 | A | 6/2005 |
| JP | 2005-343034 | A | 12/2005 |
| JP | 2006-321185 | A | 11/2006 |
| JP | 2007-76316 | A | 3/2007 |
| JP | 2009-122303 | A | 6/2009 |
| JP | 2010-002951 | A | 1/2010 |

OTHER PUBLICATIONS

Office Action (Notice of Grounds of Rejection) issued on Jan. 21, 2014, by the Japanese Patent Office in corresponding Japanese Patent Application No. 2011-289152 and an English translation of the Office Action. (7 pages).

* cited by examiner

*Primary Examiner* — Fred Guillermety
(74) *Attorney, Agent, or Firm* — Buchanan Ingersoll & Rooney PC

(57) ABSTRACT

An information transmission system includes a first image processing device and a second image processing device. The first image processing device includes a memory for storing information associated with each user. In the information transmission system, an authentication unit authenticates a user. A receiving unit receives an instruction for identifying information to be transmitted to the second image processing device, from information associated with the user authenticated by the authentication unit. A transmission unit transmits the information identified by the instruction received by the receiving unit, from the first image processing device to the second image processing device. The authentication unit authenticates a second user with a first user having been authenticated. The receiving unit receives an instruction for identifying the information from information associated with the first user authenticated and information associated with the second user authenticated.

14 Claims, 29 Drawing Sheets

FIG.15A
FIG.15B
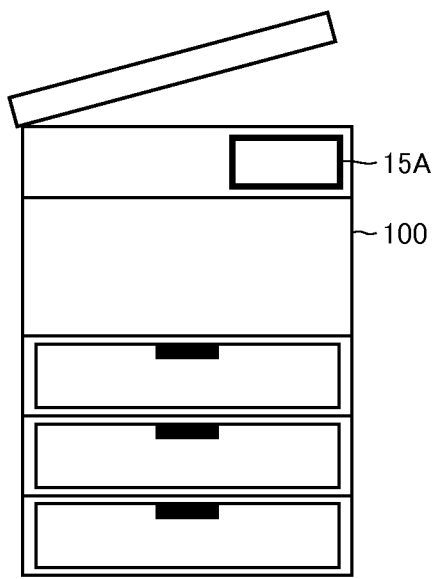
WITH PANEL ATTACHED
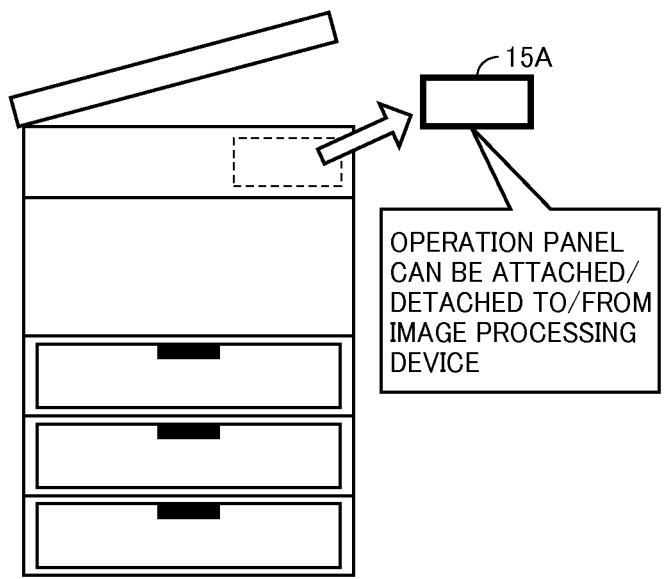
WITH PANEL DETACHED
OPERATION PANEL CAN BE ATTACHED/ DETACHED TO/FROM IMAGE PROCESSING DEVICE

FIG.20A

MFP100

| USER ID | COUNT |
|---------|-------|
| A | 512 |
| B | 15 |
| C | 10 |
| D | 80 |
| ⋮ | ⋮ |

FIG.20B

MFP200

| USER ID | COUNT |
|---------|-------|
| A | 4 |
| B | 2 |
| C | 93 |
| D | 0 |
| ⋮ | ⋮ |

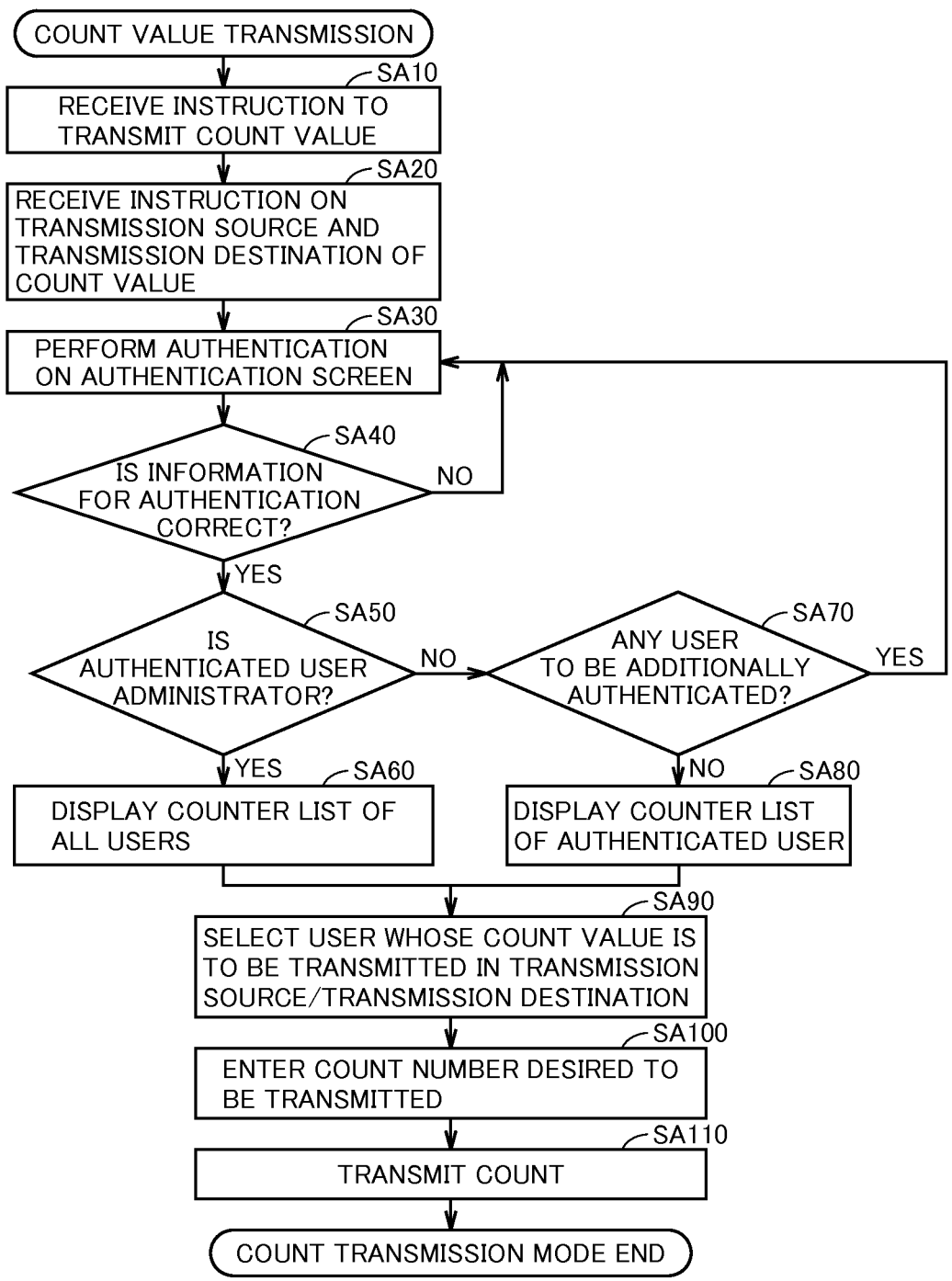

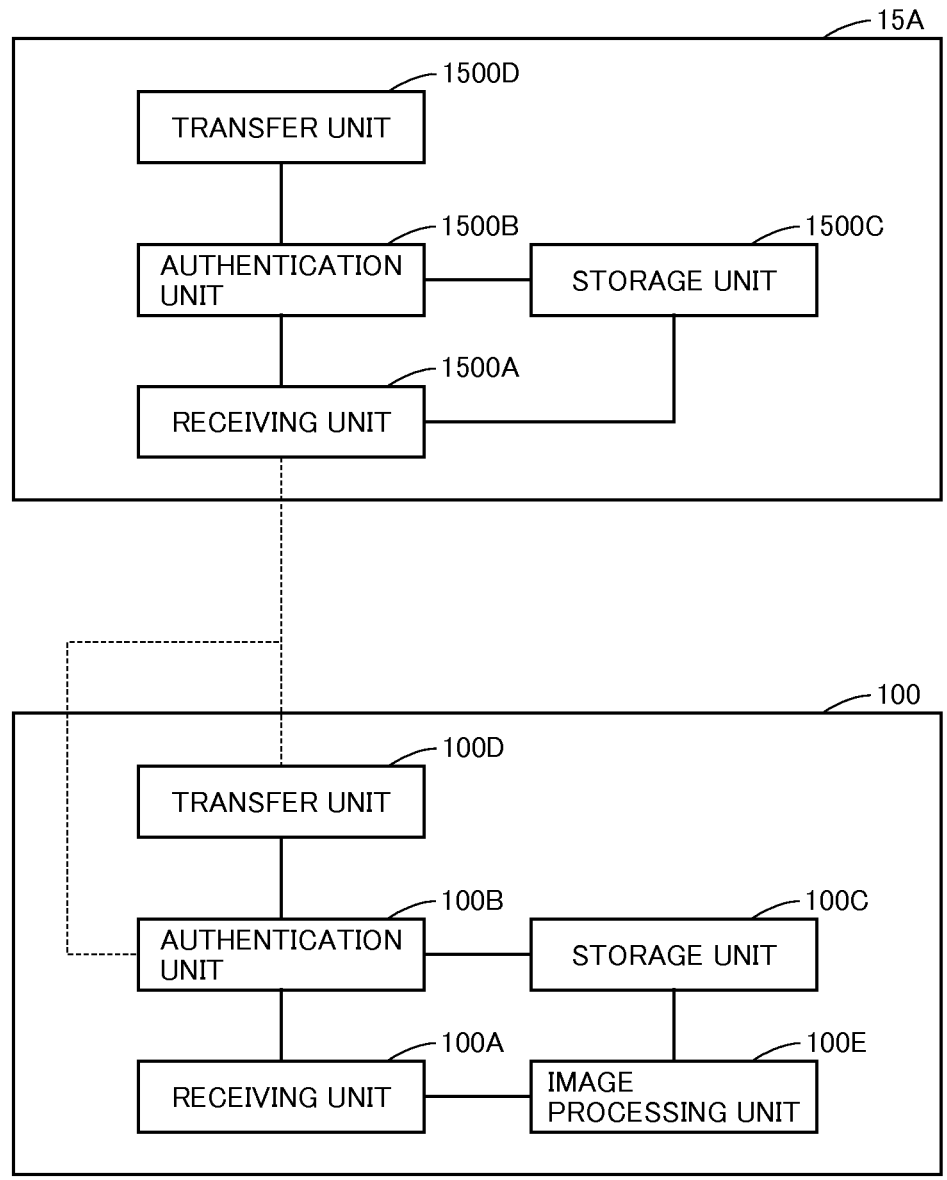

FIG.29A

MFP100

| USER ID | COUNT |
|---------|-------|
| A | 462 |
| B | 15 |
| C | 10 |
| D | 80 |
| ⋮ | ⋮ |

FIG.29B

MFP200

| USER ID | COUNT |
|---------|-------|
| A | 4 |
| B | 52 |
| C | 93 |
| D | 0 |
| ⋮ | ⋮ |

INFORMATION TRANSMISSION SYSTEM AND METHOD WITH MULTIPLE USER AUTHENTICATION

This application is based on Japanese Patent Application No. 2011-289152 filed with the Japan Patent Office on Dec. 28, 2011, the entire content of which is hereby incorporated by reference.

BACKGROUND OF THE INVENTION

1. Field of the Invention

The present invention relates to an information transmission system, and more particularly to an information transmission system including a plurality of image processing devices.

2. Description of the Related Art

Conventionally, for a system including a plurality of image processing devices, various techniques have been proposed for job transmission among the image processing devices.

For example, Patent Literature 1 (Japanese Laid-Open Patent Publication No. 2005-173920) discloses a print system in which, when printing of a certain job is interrupted due to some trouble in a certain image processing device, that job is sent to another image processing device as a backup job, and when the first image processing device is still unable to produce an output at the timing when a waiting job in the other image processing device is finished, the other image processing device is caused to output the above-mentioned job. In that print system, when the certain image processing device is recovered before the waiting job in the other image processing device is finished, the certain image processing device is caused to output the above-mentioned job, and the backup job having been sent is deleted.

Patent Literature 2 (Japanese Laid-Open Patent Publication No. 2007-076316) discloses a technique, by which, in an image processing device, the output priority upon receipt of job data from the outside is determined based on any one or more of job registered time, capacity of job data, time period required for output of job data, job data creator information, job data registered time in each terminal, and output priority set up in each terminal.

When a job is transmitted between image processing devices as described above, it is preferable that, for each job, authentication of a user having registered the job be required. This is considered because each user specifies an image processing device in which a job is first registered with some intention.

Here, if a trouble occurs in a certain image processing device and thus all registered jobs are transferred to another image processing device, then, for each job to be transferred, the user having registered the job needs to perform operations for authentication and transmission, which is complicated. In such a case, if the respective jobs have been registered by different users, still more complicated operation is required.

The present invention was made in view of these circumstances, and has an object to further facilitate an operation in an information transmission system in the case where a plurality of jobs are transmitted between image processing devices.

SUMMARY OF THE INVENTION

According to an aspect, an information transmission system including a first image processing device and a second image processing device is provided. The first image processing device is configured to include a memory for storing information associated with each user. The information transmission system further includes an authentication unit configured to authenticate a user, a receiving unit configured to receive an instruction for identifying information to be transmitted to the second image processing device, from the information associated with the user authenticated by the authentication unit, and a transmission unit configured to transmit the information to be transmitted, from the first image processing device to the second image processing device. The information to be transmitted is identified by the instruction received by the receiving unit. The authentication unit is configured to authenticate a second user with a first user having been authenticated. The receiving unit is configured to receive the instruction for identifying the information from information associated with the first user authenticated by the authentication unit and information associated with the second user authenticated by the authentication unit.

Preferably, the first image processing device includes the authentication unit, the receiving unit and the transmission unit.

Preferably, the information transmission system further includes an information processing device that can communicate with the first image processing device and that can be attached/detached to/from the first image processing device. The information processing device includes the authentication unit, the receiving unit and the transmission unit.

Preferably, the information processing device includes a storage device. The transmission unit stores, in the storage device, the information identified by the instruction received by the receiving unit, and then transmits the information to the second image processing device.

Preferably, the information is job data output from an image processing device.

Preferably, the information is a count value of a counter consumed by an image processing operation.

Preferably, when a specific user is authenticated by the authentication unit, the receiving unit receives the instruction for identifying the information from information associated with a plurality of users corresponding to the specific user.

According to another aspect, the information transmission system further facilitates an operation in the case where a plurality of jobs are transmitted between image processing devices.

According to still another aspect, a method for transmitting information in an information transmission system including a first image processing device and a second image processing device includes storing, by the first image processing device, information associated with each user, authenticating a user, receiving an instruction for identifying information to be transmitted to the second image processing device, from the information associated with the authenticated user, and transmitting the information identified by the instruction received, from the first image processing device to the second image processing device. The authenticating includes authenticating a second user with a first user having been authenticated. The receiving an instruction for identifying information to be transmitted to the second image processing device includes receiving the instruction for identifying the information from information associated with the first user authenticated and information associated with the second user authenticated.

Preferably, the first image processing device executes the authenticating a user, the receiving an instruction for identifying information to be transmitted to the second image processing device, and the transmitting the information.

Preferably, the information transmission system further includes an information processing device that can communicate with the first image processing device and that can be attached/detached to/from the first image processing device, and the information processing device includes the authenticating a user, the receiving an instruction for identifying information to be transmitted to the second image processing device, and the transmitting the information.

Preferably, the information processing device includes a storage device. The transmitting the information includes storing, in the storage device, the information identified by the instruction received, before transmitting the information to the second image processing device.

Preferably, the information is job data output from an image processing device.

Preferably, the information is a count value of a counter consumed by an image processing operation.

Preferably, when a specific user is authenticated, the receiving an instruction for identifying information to be transmitted to the second image processing device includes receiving the instruction for identifying the information, from information associated with a plurality of users corresponding to the specific user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 15A and 15B illustrate a structure of an information transmission system according to a second embodiment of the present invention.

FIGS. 20A and 20B each show an example of details of storage in a counter.

FIG. 21 is a flow chart of count value transmission processing in an information transmission system of a third embodiment.

FIG. 28 schematically shows a functional configuration of MFP and the operation panel of the second embodiment.

FIGS. 29A and 29B show another example of details of storage in the counter.

DESCRIPTION OF THE PREFERRED EMBODIMENTS

Hereinbelow, embodiments of the present invention will be described with reference to the drawings. In the following description, the same parts and components have the same characters allotted. They also have the same names and functions. Therefore, detailed description thereof will not be repeated.

First Embodiment

System Configuration

Figure 1:
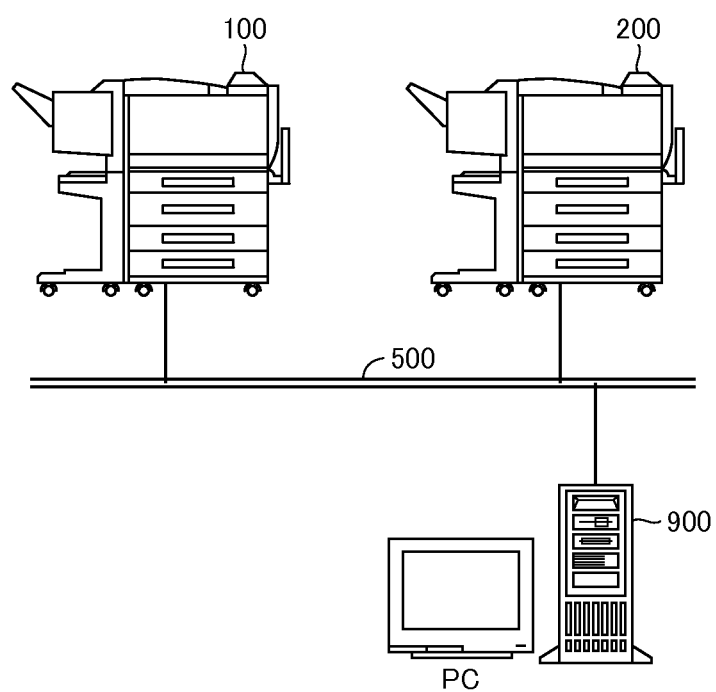
FIG. 1 shows a specific example of a structure of an information transmission system according to a first embodiment.

FIG. 1 shows a specific example of a structure of an information transmission system according to the present embodiment.

Referring to FIG. 1, the information transmission system according to the present embodiment includes MFPs 100, 200 as an example of an image processing device and a PC (personal computer) 900. They are connected through a network 500, such as LAN (Local Area Network). In the present embodiment, MFP 100 constitutes a first image processing device, and MFP 200 constitutes a second image processing device. Network 500 may be wired or may be wireless.

MFPs 100, 200 each register, as a job, a document captured by scanning therein, and/or register a job received from an external apparatus, such as PC 900. MFPs 100, 200 each sequentially execute jobs registered therein.

<Hardware Configuration of MFP>

Figure 2:
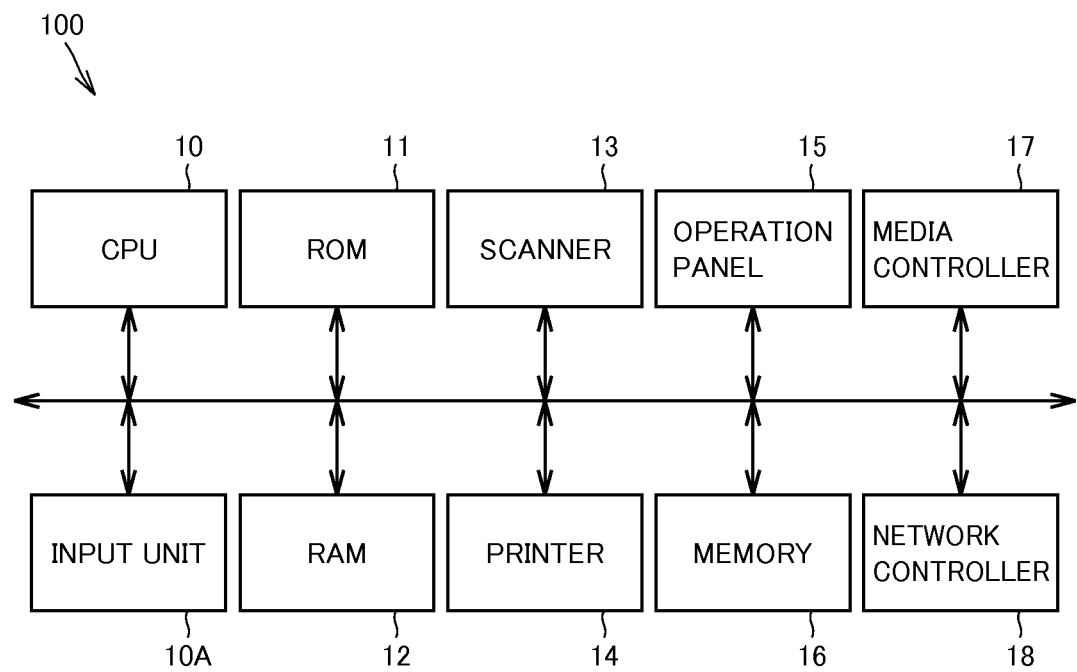
FIG. 2 shows a specific example of a hardware configuration of MFP (Multi Function Peripheral) of FIG. 1.

FIG. 2 shows a specific example of a hardware configuration of MFP 100.

Referring to FIG. 2, MFP 100 includes a CPU (Central Processing Unit) 10 as an arithmetic unit for controlling MFP 100 as a whole, a ROM (Read Only Memory) 11 for storing programs and the like to be executed by CPU 10, a RAM (Random Access Memory) 12 for functioning as a working area when a program is executed by CPU 10, a scanner 13 for optically reading a document placed on a document table not shown to obtain image data, a printer 14 for printing image data on a print sheet, an operation panel 15 including a touch panel for displaying information and receiving an operation input to MFP 100, a memory 16 for storing image data and the like, a media controller 17 for controlling communications with a storage medium for accessing a recording medium, such as a USB (Universal Serial Bus) memory, to read/write a file therefrom/therein, a network controller 18 for controlling communications through the above-described network, and an input unit 10A.

Operation panel 15 includes a touch panel which will be described later and an operation key group. The touch panel is implemented by stacking a display device, such as a liquid crystal display device, and a position pointing device, such as an optical touch sensor or an electrostatic capacity touch sensor, and displays an operation screen, so that an indicated position on the operation screen is identified.

An operation signal indicating the indicated position on the touch panel (position of touch) or a pressed key is input to CPU 10. CPU 10 identifies details of operation from the pressed key or the operation screen being displayed and the indicated position, and executes processing based thereon.

Input unit 10A is implemented by a component for entering information, such as a power button, provided on the main body of MFP 100, separately from operation panel 15. Some or all of details of operation entered through input unit 10A and some or all of details of operation entered through operation panel 15 may be common.

Programs executed by CPU 10 may be stored in a storage medium set in media controller 17. Examples of the storage medium include media that store programs in a nonvolatile manner, such as a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, a magnetic tape, a cassette tape, an MO (Magnetic Optical Disc), an MD (Mini Disc), an IC (Integrated Circuit) card (excluding a memory card), an optical card, a mask ROM, an EPROM, and an EEPROM (Electronically Erasable Programmable Read-Only Memory).

Figure 27:
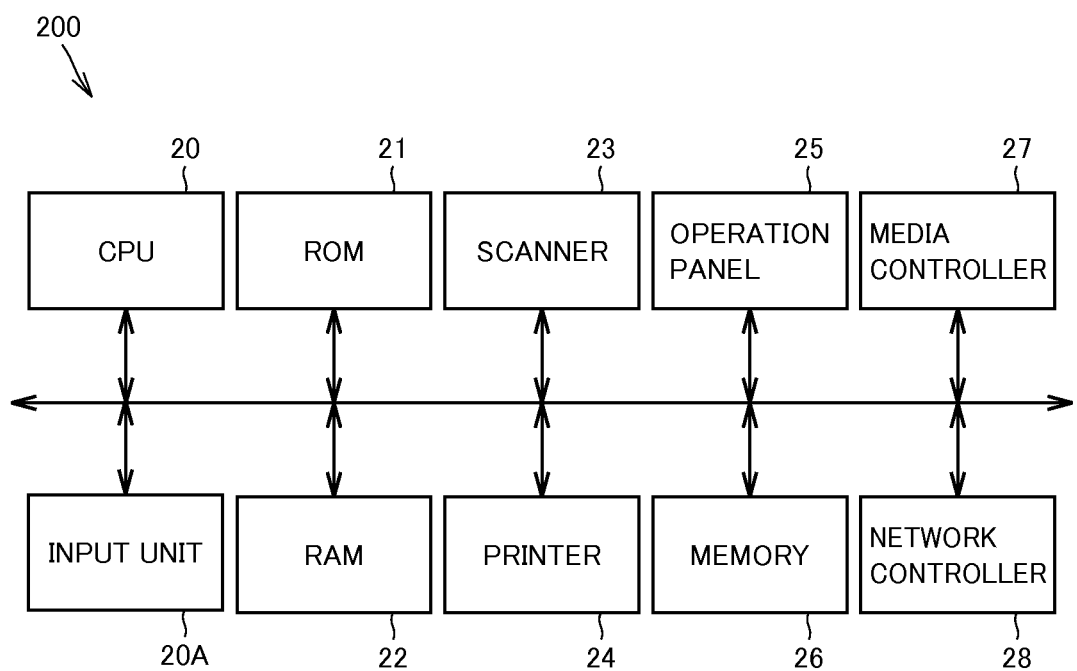
FIG. 27 shows a specific example of a hardware configuration of another MFP of FIG. 1.

FIG. 27 shows a specific example of a hardware configuration of MFP 200. MFP 200 includes a CPU 20, an input unit 20A, a ROM 21, a RAM 22, a scanner 23, a printer 24, an operation panel 25, a memory 26, a media controller 27, and a network controller 28 respectively corresponding to CPU 10, input unit 10A, ROM 11, RAM 12, scanner 13, printer 14, operation panel 15, memory 16, media controller 17, and network controller 18 of MFP 100. MFP 200 is not required to have the same configuration as MFP 100 if it has a communication function and an image processing function for executing a job.

<Functional Configuration of MFP>

Figure 3:
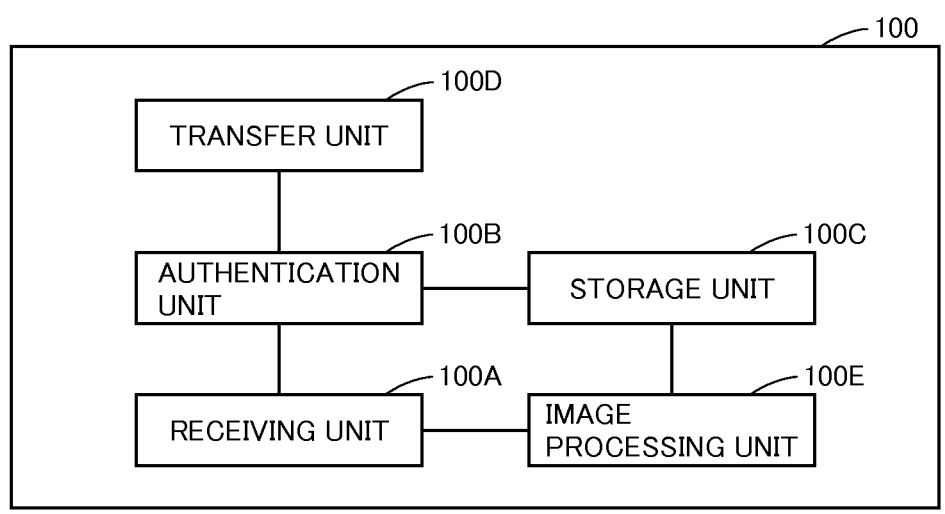
FIG. 3 schematically shows a functional configuration of MFP of FIG. 1.

FIG. 3 schematically shows a functional configuration of MFP 100.

MFP 100 includes a receiving unit 100A receiving input of information by a user operation, information communication from an external device or the like, an authentication unit 100B executing processing for user authentication, a storage unit 100C storing various types of data such as job data, a transfer unit 100D for transferring job data stored in storage unit 100C to another device, and an image processing unit 100E executing a job stored in storage unit 100C.

Receiving unit 100A is implemented, for example, by operation panel 15. Authentication unit 100B is implemented, for example, by CPU 10 executing a program as appropriate. Storage unit 100C is implemented, for example, by memory 16. Transfer unit 100D is implemented, for example, by network controller 18. Image processing unit 100E is implemented, for example, by scanner 13 and/or printer 14.

<Job Data>

As described above, in each of MFPs 100, 200, information on each job (job data) registered therein is stored in memory 16 or the like. An example of contents of job data stored in memory 16 of MFP 100 is shown in Table 1.

TABLE 1

Job Data

| Attribute data name | Example of real data |
| --- | --- |
| Job name | A_job1 |
| Registered time | 2011/4/1 09:01 |
| User ID | A |
| Number of image pages | 7 |
| Image file name | image0032.img |
| Image data | (Real image data) |

Referring to Table 1, job data includes the attribute data name and real data associated therewith. The attribute data name includes job name, registered time, user ID, number of image pages, image file name, and image data. When a job is registered, CPU 10 generates job data of that job.

The job name is the name of a job, and is generated and registered by CPU 10 when, for example, the job is generated in MFP 100 or the like. The job name thus generated may include a name of a user having performed an operation for generating that job. The job name may be changed by an operation on operation panel 15 or the like.

The registered time is the time when that job is registered in MFP 100. CPU 10 registers, in the job data, the time when an operation of registering that job in MFP 100 is performed (or the time when input of information for registering that job is received from an external device), as the registered time.

The user ID is an ID of a user having registered the job. When the job is registered in MFP 100, CPU 10 registers, as the user ID, the ID of a user who has logged in to MFP 100 at the time of registration. When the job has been received from another device, CPU 10 registers the ID of the user sent with that job, as the user ID.

The number of image pages is the number of pages subjected to a print operation when a job is executed. For example, when the job is to print three copies of 2-page image data, the number of image pages will be 3 times 2 pages of image data, that is, six pages.

The image file name is the name of a target image file (for printing, etc.) in a job. The image data is real data of that image file.

<Job List>

In MFPs 100, 200, the job execution schedule is registered in memory 16 or the like as a job list. An example of contents of the job list stored in memory 16 of MFP 100 is shown in Table 2.

TABLE 2

Job List

| Job name | Estimated start time | Estimated finish time |
| --- | --- | --- |
| A_job1 | 10:00 | 10:09 |
| B_job1 | 10:10 | 10:19 |
| C_job1 | 10:20 | 10:24 |
| C_job2 | 10:25 | 10:30 |
| . | . | . |
| . | . | . |
| . | . | . |

Referring to Table 2, the job list includes, for each job, the job name, the estimated start time of that job, and the estimated finish time of that job.

Upon receipt of an operation for registering a new job or upon receipt of information for registering a job, CPU 10 calculates the estimated start time and the estimated finish time of that job, and adds them to the job list. The estimated start time of a job is determined assuming that a job newly registered is started after a job registered at the end of the job list is finished. The estimated finish time is determined based on the estimated start time and the time predicted to be required for execution of a job. The time predicted to be required for execution of a job is determined based on the number of image pages (Table 1), for example.

The job list is a list in which jobs waiting in MFP 100 are registered. When execution of a job registered in the job list is completed, CPU 10 deletes record of that job from the job list. When a job is transferred to another device, CPU 10 also deletes record of that job from the job list.

<User List>

In the information transmission system of the present embodiment, user authentication is performed. That is, when a user uses the system, he/she is required to be authenticated at login or the like. MFP 100 has registered therein the user list as data for the authentication. The user list may be registered in a sole server in the system, and CPUs 10, 20 of MFPs 100, 200 may communicate with that server to refer to the user list every time processing for user authentication is executed.

An example of contents of the above-described user list is shown in Table 3.

TABLE 3

User List

| User ID | Password | User type |
|---------|----------|-----------|
| A | **** | Administrator |
| B | **** | Public |
| C | **** | Public |
| D | **** | Public |
| . | . | . |
| . | . | . |
| . | . | . |

In the user list, the user ID, the password and the user type are registered for each user. In the present embodiment, the user type includes an administrator and a public user. Without authenticating another user, the administrator can instruct, for example, transmission of a job registered by the other user.

<Job Transmission Processing>

Figure 4:
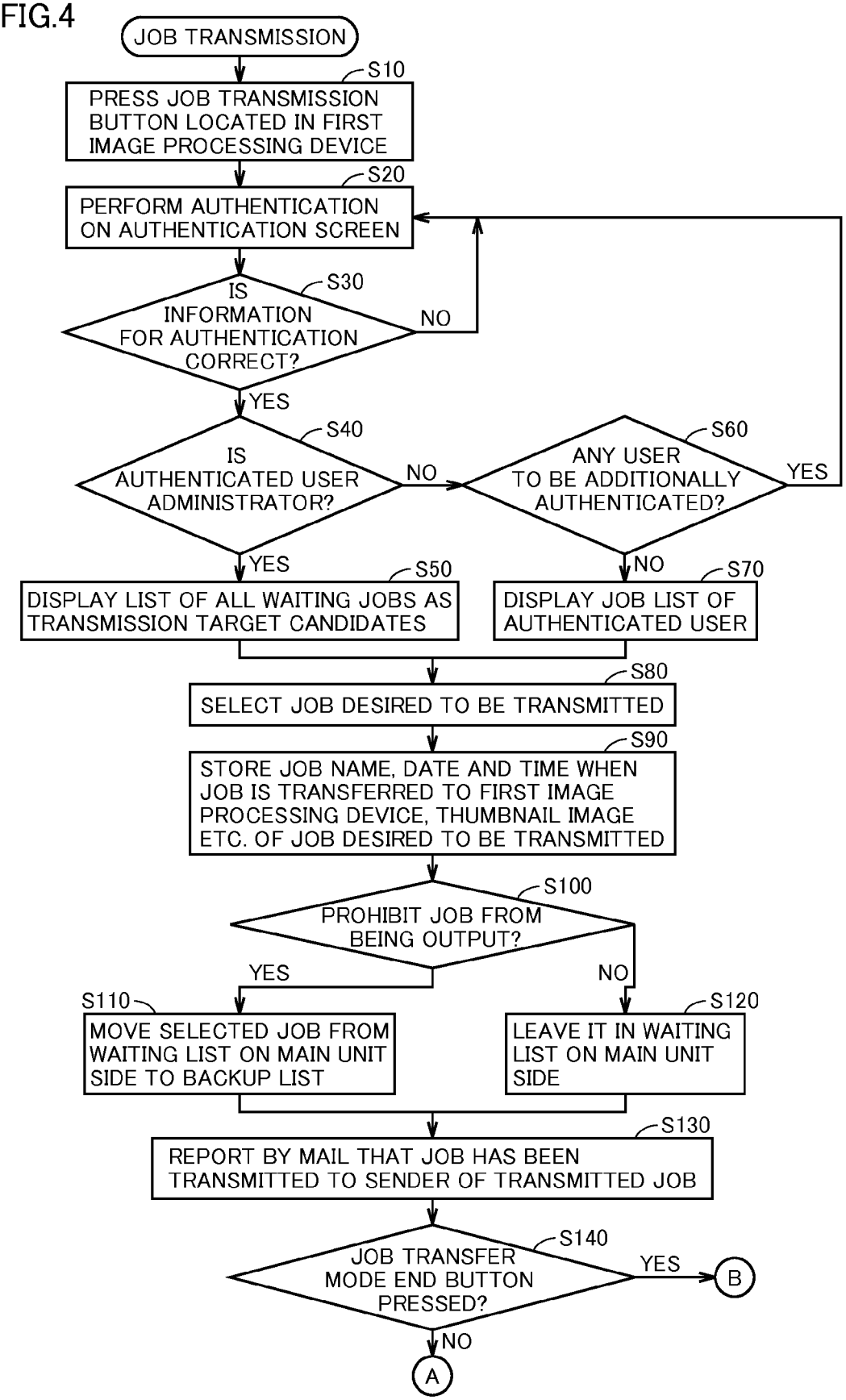
FIGS. 4 and 5 are a flow chart of job transmission processing in the first embodiment.
Figure 5:
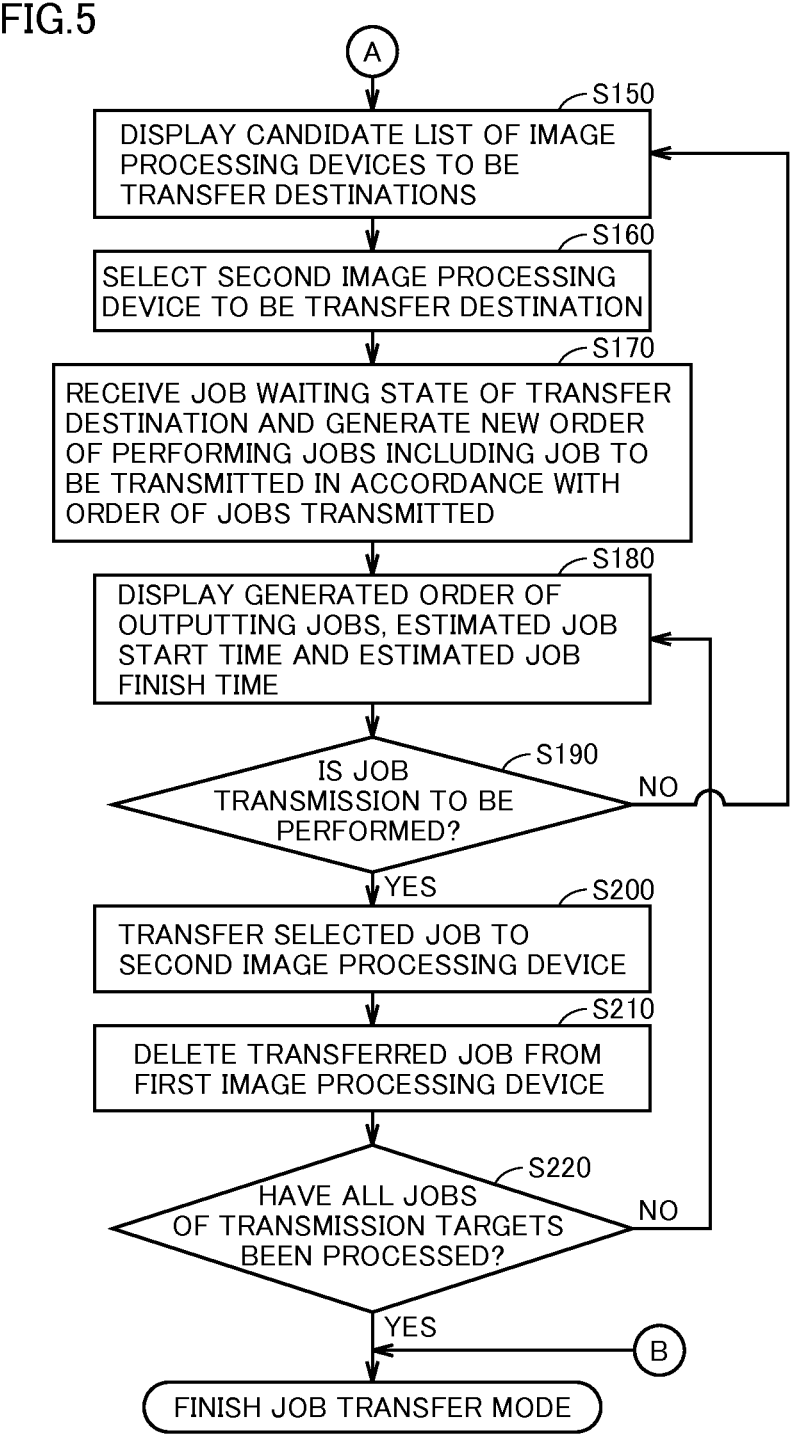

In the information transmission system of the present embodiment, when a trouble such as jam or failure occurs in MFP 100, a job registered in MFP 100 can be transmitted to another image processing device (MFP 200 or the like). FIGS. 4 and 5 are flow charts of processing executed for transmitting a job registered in MFP 100 (job transmission processing). The details of job transmission processing will be described below mainly referring to FIGS. 4 and 5.

The job transmission processing is executed, for example, under the situation where there are a large number of waiting jobs in MFP 100 or MFP 100 is out of order, and then a user transmits a job registered in MFP 100 to another image processing device.

First, the user presses a "JOB TRANSMISSION" button of MFP 100 (step S10 of FIG. 4). CPU 10 thereby brings MFP 100 into a job transmission mode.

Figure 6:
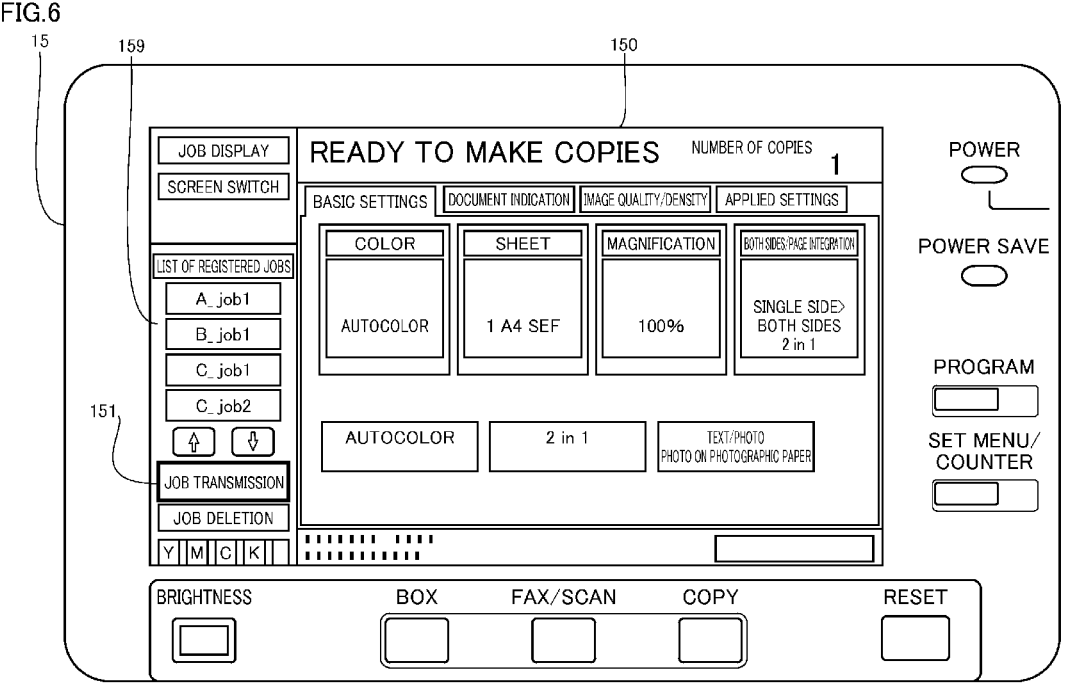
FIGS. 6 to 14 each show an example of an appearance of an operation panel of MFP of FIG. 1.

FIG. 6 shows an appearance of operation panel 15 of MFP 100. Operation panel 15 includes a display section 150, and a screen for printing including a message such as "READY TO MAKE COPIES" is displayed in display section 150. The screen for printing includes a button 151 reading "JOB TRANSMISSION." Button 151 corresponds to the "JOB TRANSMISSION" button. CPU 10 brings MFP 100 into the job transmission mode in response to that button 151 has been performed.

Figure 7:
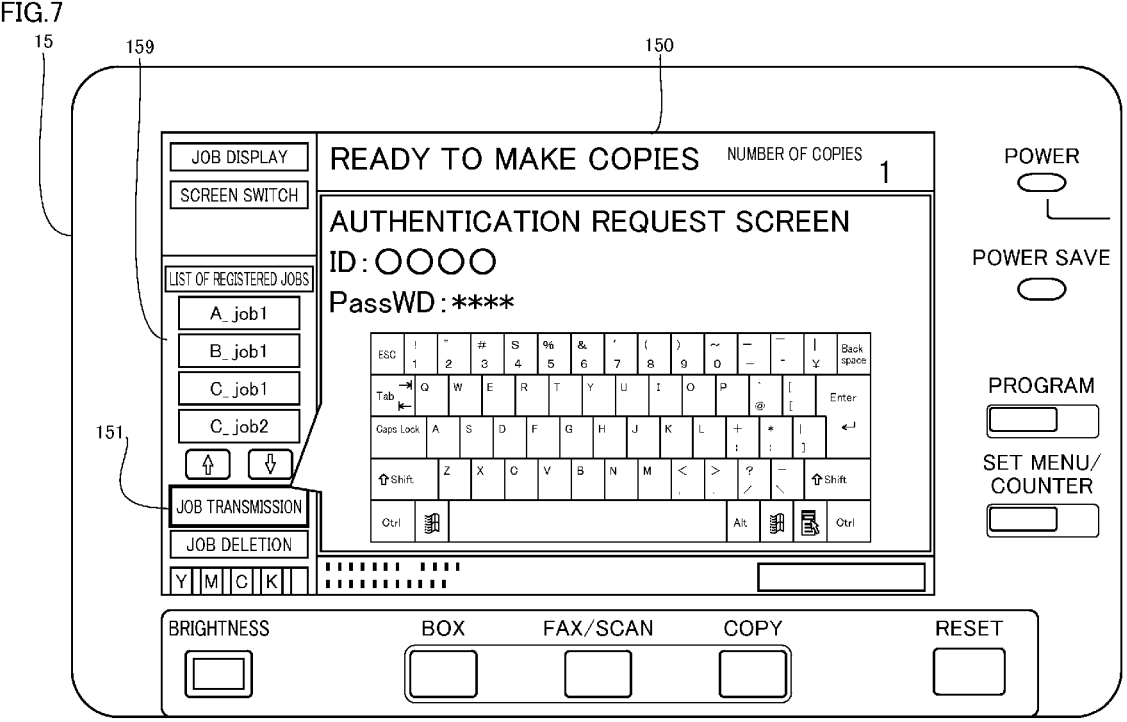

When the job transmission mode is brought about, CPU 10 causes display section 150 of operation panel 15 to display a screen as shown in FIG. 7 for performing user authentication (step S20).

In FIG. 6, a display box 159 displaying a list of registered jobs (jobs registered in the job list (Table 2)) is displayed in display section 150.

Displayed in display section 150 of FIG. 7 as an authentication request screen is a screen that prompts to enter a user ID and a password (PassWD). The user enters his/her user ID and password using a software keyboard or the like displayed on the same screen. CPU 10 then determines whether or not these pieces of information entered (user ID and password; hereinafter also referred to as "information for authentication" as appropriate) are correct. If determined that they are correct, the process is advanced into step S40. If determined that they are incorrect, the process is returned to step S20, and processing in steps S20 and S30 is repeated until correct information is entered.

Here, that information for authentication is correct means that, for example, the information for authentication matches any combination of user ID and password stored in the user list.

The mode of user authentication is not limited to the use of the combination of user ID and password as shown in Table 3. Authentication may be performed using an ID card, a fingerprint, a voiceprint, the face, or the like.

In step S40, CPU 10 determines whether or not the type of an authenticated user is an administrator (Table 3). If determined that he/she is an administrator, the process is advanced into step S50. If determined that he/she is not an administrator (public user), the process is advanced into step S60.

Figure 8:
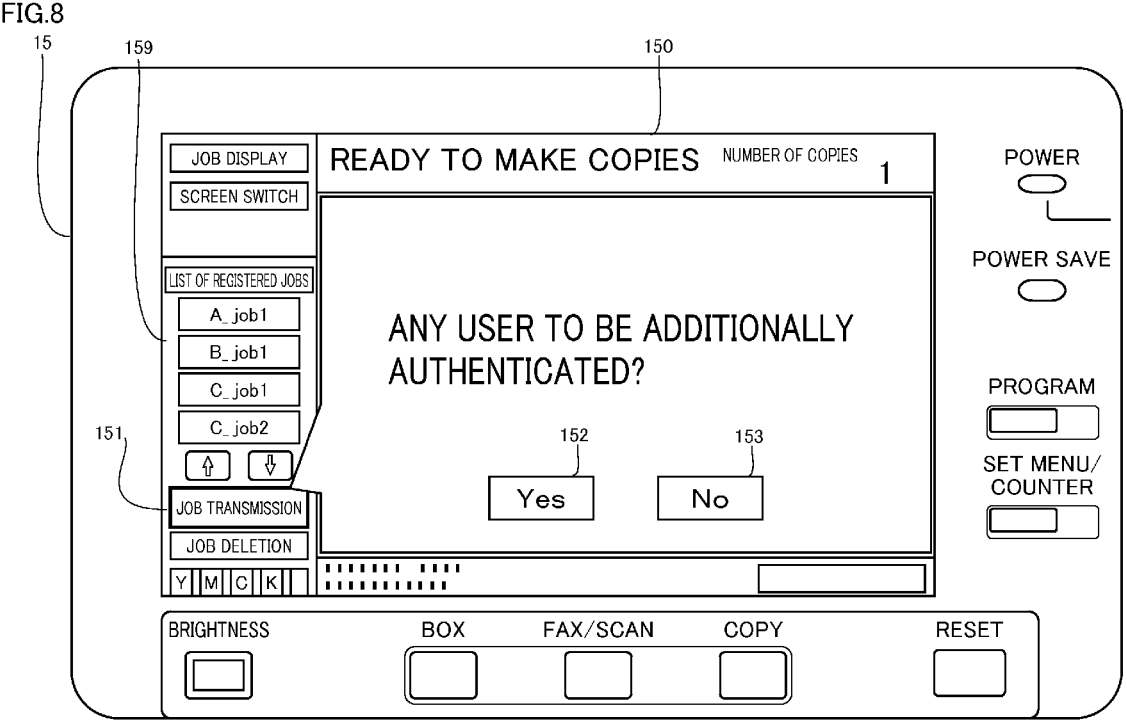

In step S60, CPU 10 determines whether or not authentication of another user is further performed. If determined that authentication is to be performed, the process is returned to step S20. If determined that authentication is not to be performed, the process is advanced into step S70. Here, when information requesting authentication of another user is input, CPU 10 returns the process to step S20. The input of information is achieved by, for example, an operation of a YES button 152 in screen 150 including a message of "ANY USER TO BE ADDITIONALLY AUTHENTICATED?" shown in FIG. 8. On the other hand, when information indicating that authentication is to be finished is input, CPU 10 advances the process into step S70. The input of information indicating that authentication is to be finished is achieved by, for example, an operation of a NO button 153 in screen 150 of FIG. 8.

In step S70, among the jobs registered in the job list (Table 2), jobs of all the users having been authenticated so far are extracted and displayed. "Users" appearing in the jobs of users here represent users identified by user IDs in job data. In step S70, in the case where the jobs registered in the job list include a job of a user A, a job of a user B, a job of a user C, and a job of a user D, and in the case where two users B and C are authenticated by repetition of steps S20 to S60, the job of user B and the job of user C among the jobs registered in the job list are extracted and displayed as transmission target candidates. CPU 10 then advances the process into step S80.

Figure 9:
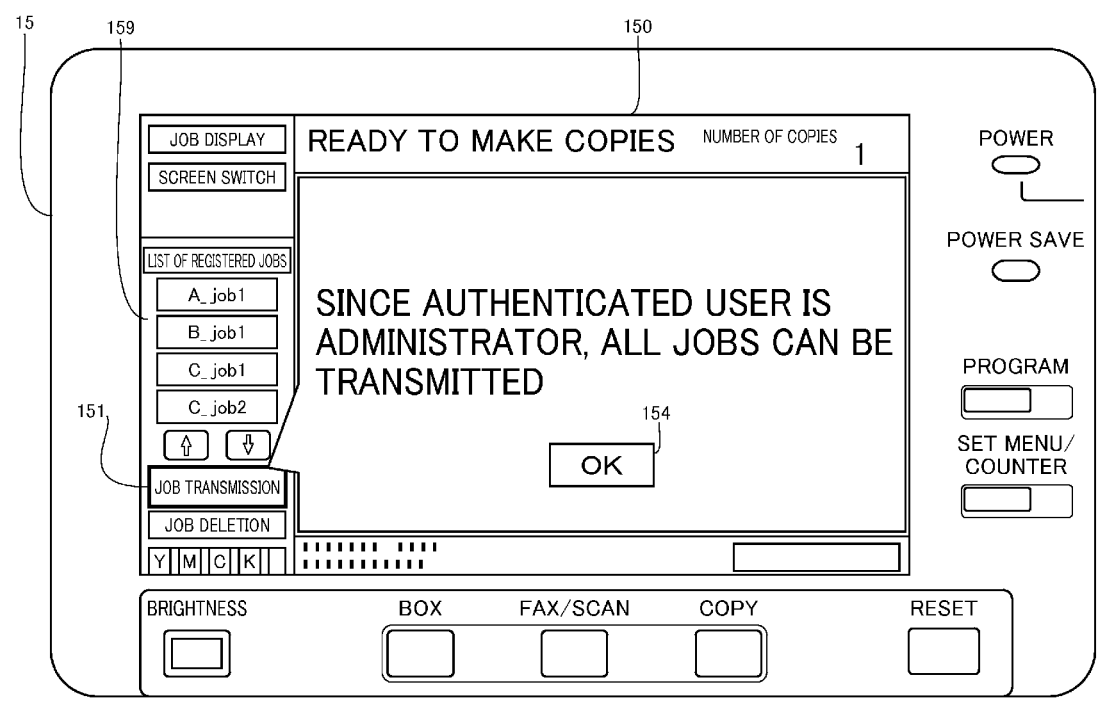

On the other hand, in step S50, after reporting that the authenticated user is an administrator, CPU 10 causes all the jobs registered in the job list (Table 2) to be displayed as transmission target candidates, and advances the process into step S80. The reporting here is achieved by causing display section 150 to display a message of "SINCE AUTHENTICATED USER IS ADMINISTRATOR, ALL JOBS CAN BE TRANSMITTED" as shown in FIG. 9, for example. Then, when OK button 154 displayed together with that message, for example, is operated CPU 10 switches the display of display section 150 to display transmission target candidates.

Figure 10:
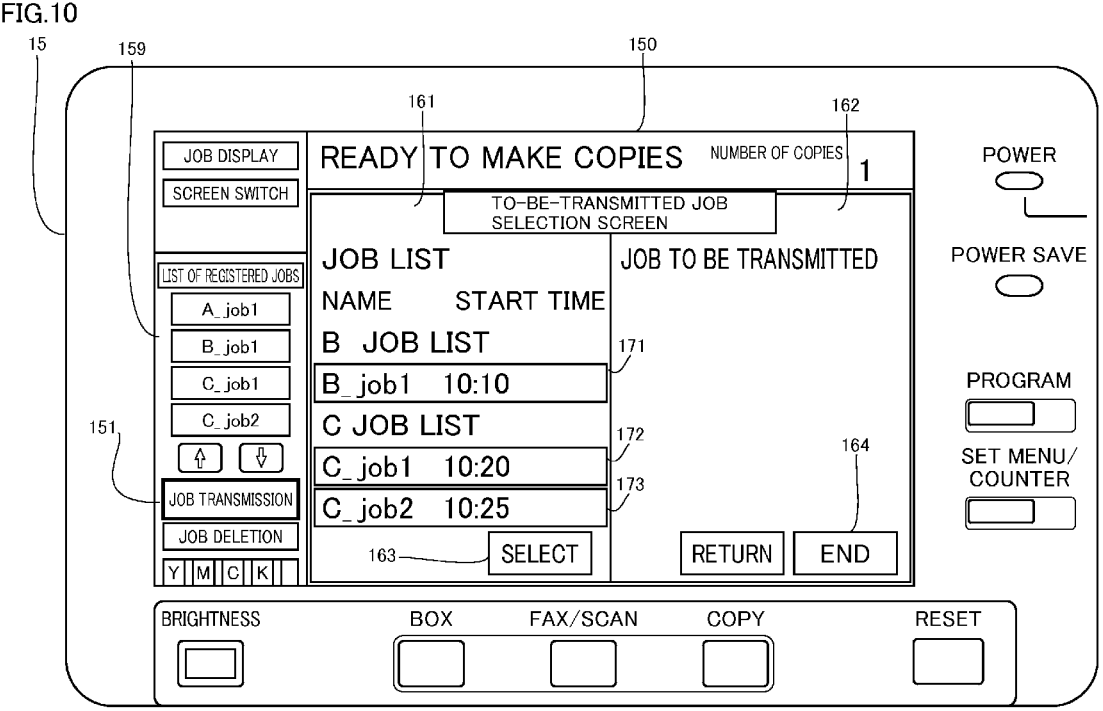

FIG. 10 shows an exemplary display of transmission target candidates in step S50 or step S70. Display section 150 of FIG. 10 includes a display box 161 in which transmission target candidates are displayed. In display box 161, the job of user B (job name "B_job1") is shown under the title of "B JOB LIST." Jobs of user C (job names "C_job1" and "C_job2") are shown under the title of "C JOB LIST." In display box 161, the estimated start time of each job is shown together with the job name.

In step S80, CPU 10 receives input of information of selecting jobs desired to be transmitted from among the jobs as transmission targets displayed in step S50 or step S70, and advances the process into step S90.

Figure 11:
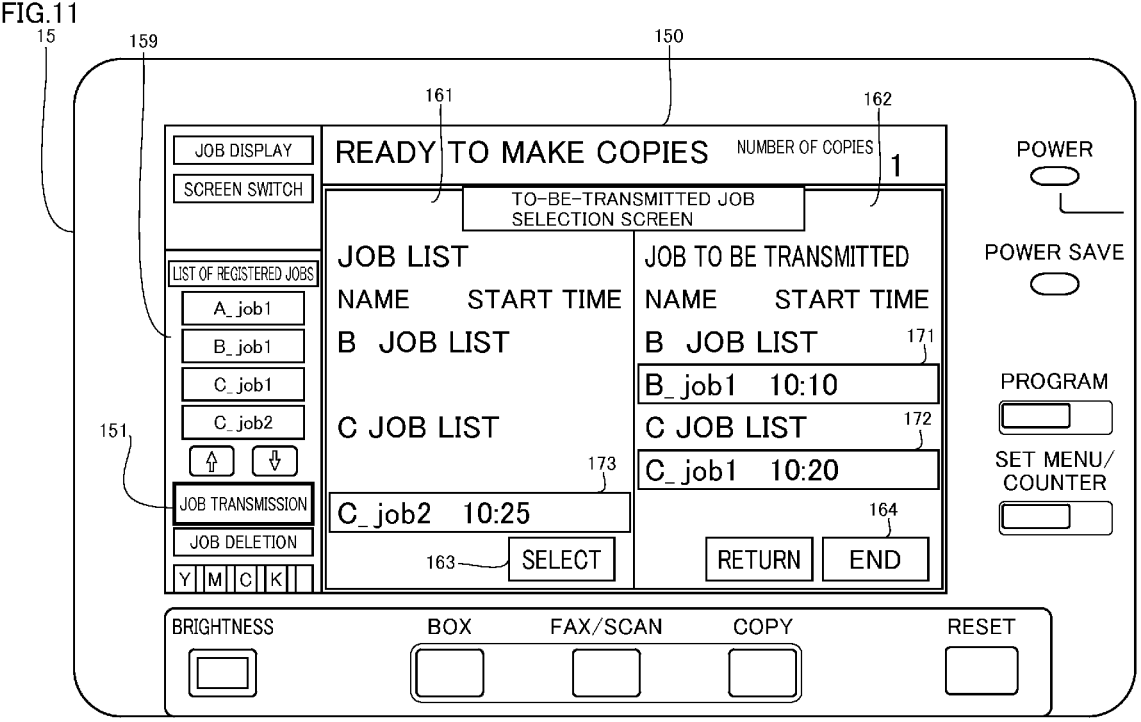

The input of information of selecting jobs is achieved by, for example, in FIG. 10, touching each of icons 171, 172 and 173 corresponding to job names "B_job1", "C_job1" and "C_job2", respectively, to highlight them and operating a selection button 163. By operating selection button 163, the highlighted icons in display box 161 move to a display box 162 as shown in FIG. 11. By further touching the icons displayed in display box 162 to highlight them and operating a button 164, the icons can be returned to display box 161, that is, to the state where selection as transmission targets has been canceled.

In step S90, for the jobs selected in step S80 from among the jobs displayed as transmission targets, CPU 10 stores, in RAM 12, information registered in the job data such as the job name (excluding "image data") as information to be sent to another image processing device, and advances the process into step S100.

In step S100, it is identified whether or not to set to prohibit MFP 100 from outputting the jobs selected in step S80. These setting details may be previously registered in MFP 100, or a user may enter the setting details every time the job transmission processing is executed. When it is set to prohibit MFP 100 from producing an output, CPU 10 advances the process into step S110, and when it is set to allow MFP 100 to produce an output, advances the process into step S120.

In step S110, CPU 10 removes information on the selected jobs from the job list, moves it to another list such as a backup list, and advances the process into step S130.

In step S120, CPU 10 advances the process into step S130 without making any change in the job list.

In step S130, CPU 10 reports transmission of the selected jobs to the users of respective jobs by sending mail, and advances the process into step S140. For example, the mail address of each user is registered in the user list (Table 3), and CPU 10 sends mail including the job name and a predetermined message ("Job name xx is output from another image processing device") to users corresponding to user IDs of the jobs selected as transmission targets.

In step S140, CPU 10 determines whether or not an operation for terminating the job transmission processing has been performed. That operation is, for example, a touch operation on end button 164 in FIG. 10 and the like. If determined that such an operation has been performed, CPU 10 terminates the job transmission processing. That is, after returning the change in the job list in step S110 to an original state (i.e., after returning the information on jobs having been moved to another list, to the job list), the display of display section 150 is returned to that shown in FIG. 6 and the like. If determined that such an operation has not been performed, CPU 10 advances the process into step S150 (see FIG. 5).

In step S150, CPU 10 causes display section 150 to display the list of image processing devices to be transfer destinations, and advances the process into step S160.

Figure 12:
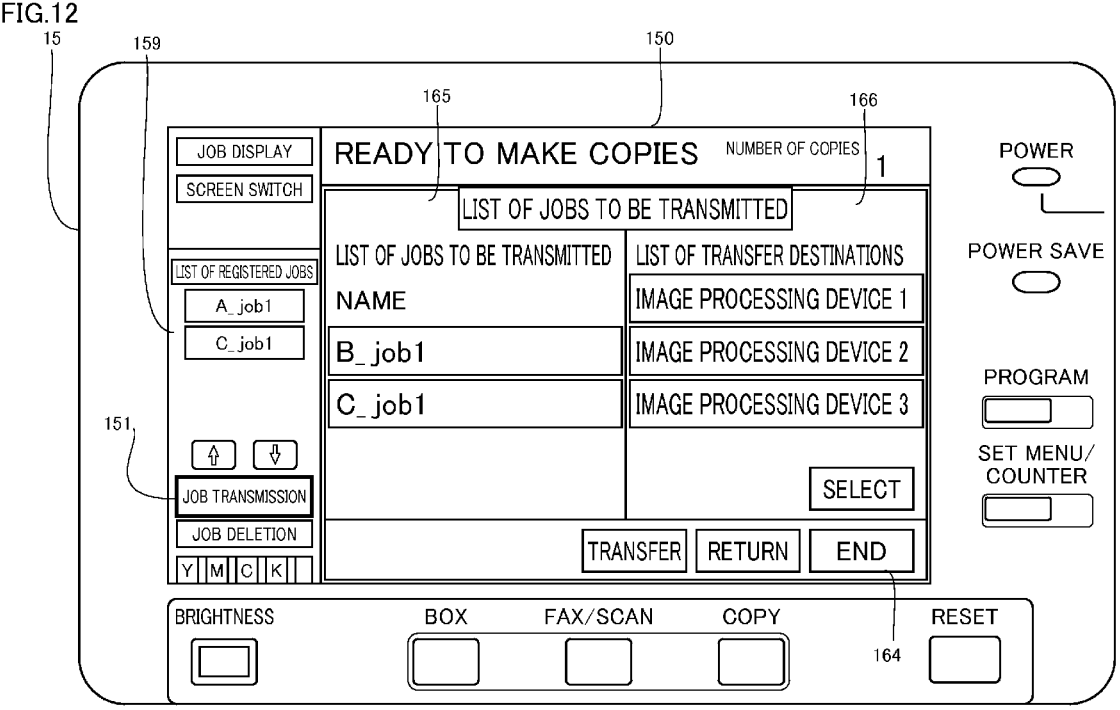

FIG. 12 shows exemplary list display of image processing devices to be destinations. In display section 150 of FIG. 12, icons of the jobs selected as transmission targets are displayed on the left side of the screen, and a list of the image processing devices to be transfer destination candidates (image processing devices 1 to 3) is displayed on the right side of the screen. Here, the image processing devices constituting the list can be, for example, other image processing devices in the system previously registered in memory 16 and can be those that are currently capable of communicating with MFP 100.

The example shown in FIG. 12 is an example in the case where the jobs selected as transmission targets have been removed from the job list of MFP 100 (YES in step S100). Accordingly, as compared with display box 159 of FIG. 6, "B_job1" and "C_job1" (selected as transmission targets) deleted from the job list of MFP 100 have been deleted in display box 159 located on the left side of the screen. In step S130, the user of each job receives a report that his/her job has been selected as a transmission target. Therefore, even if a job of another user is selected as a transmission target by the administrator or by some of the plurality of users authenticated in steps S20 to S60, the user of the selected job can reliably recognize that his/her job has been selected as a transmission target.

Next, CPU 10 in step S160 selects one in the candidate list of image processing devices as transfer destinations displayed in step S150. That selection is made, for example, in accordance with details of a user operation on operation panel 15.

Figure 13:
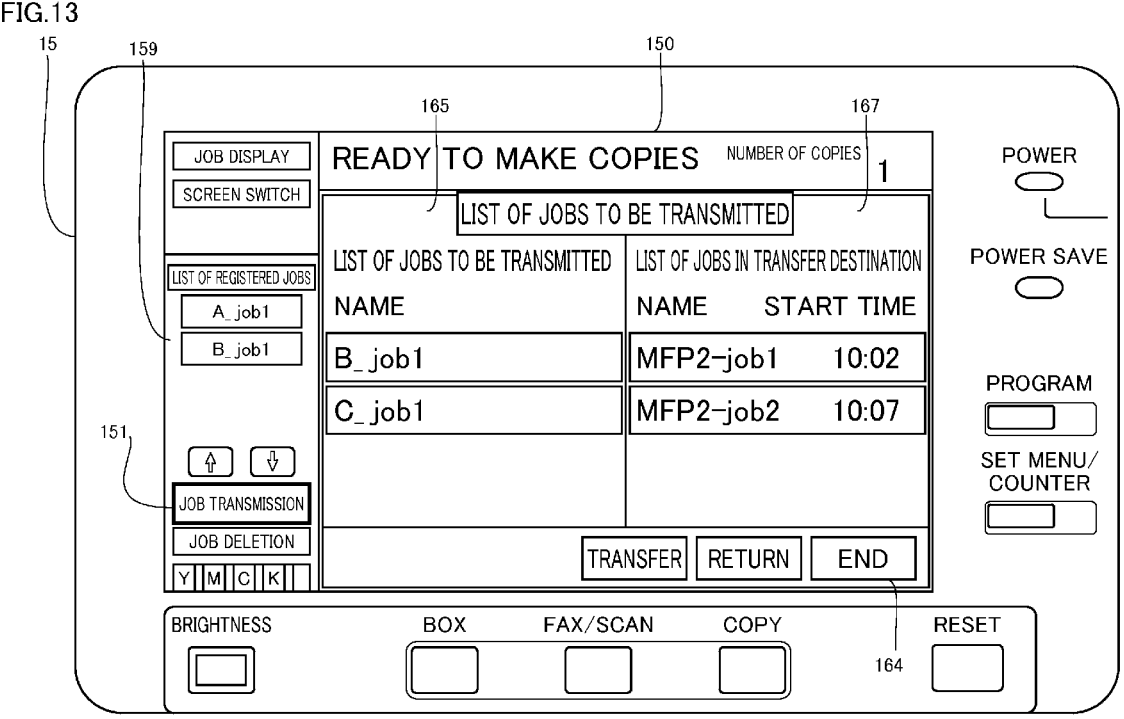

Next, CPU 10 in step S170 causes operation panel 15 to display the order of performing jobs at the transfer destination selected in step S160. An example of details of display in display section 150 on this occasion is shown in FIG. 13. In display section 150 of FIG. 13, the job list in the indicated image processing device as the transfer destination is displayed in a display box 167. CPU 10 achieves the display in FIG. 13 by, for example, receiving, from the indicated image processing device as the transfer destination, the job list in that image processing device.

Figure 14:
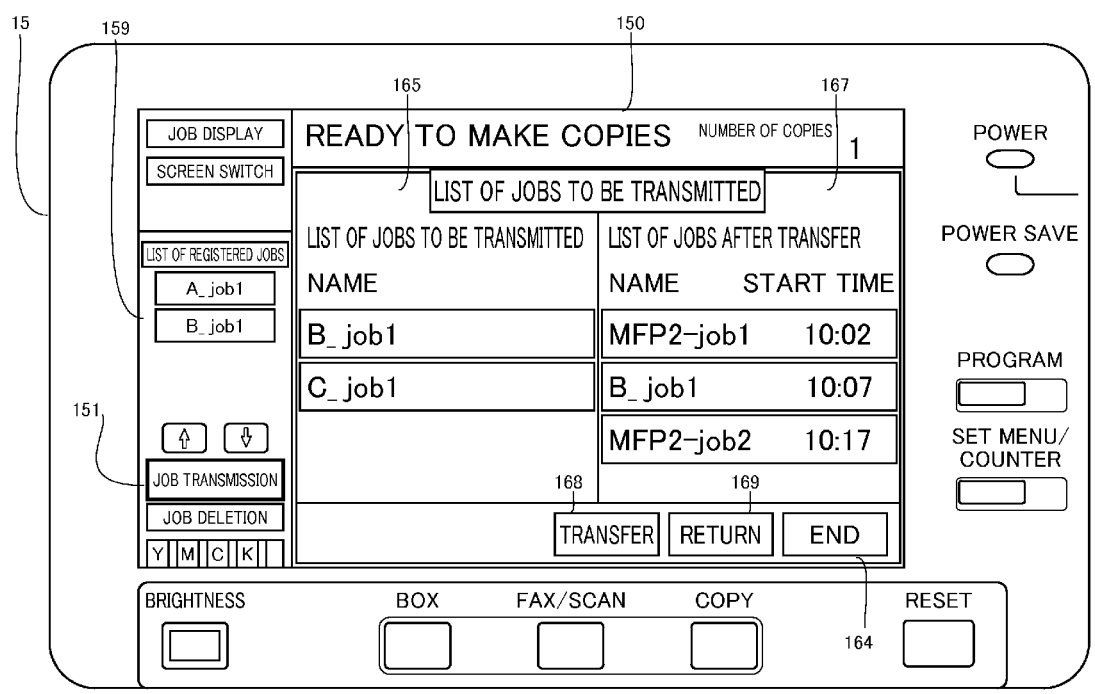

In the state shown in FIG. 13, when a predetermined operation is performed on operation panel 15 or when a certain time has elapsed, for example, CPU 10 in step S180 causes a job selected as a transmission target to be added to and displayed in the job list in the transfer destination. An example of such a display mode is shown in FIG. 14. The job list having been updated is displayed in display box 167 of FIG. 14. In the updated job list, the job selected as the transmission target (B_job1) is located between the jobs already included in the job list in the transfer destination (FIG. 13) (between "MFP2-job1" and "MFP2-job2").

In the system of the present embodiment, in each MFP, registered jobs are executed in accordance with, for example, the order of registered time of the respective jobs. In step S180, in addition to the job list, CPU 10 obtains the job data (see Table 1) of the jobs registered in that job list from the image processing device as the transfer destination. In the updated job list (FIG. 14), the jobs included in the job list in the transfer destination (FIG. 13) and the jobs selected as transmission targets are arranged in the order of registered time. Therefore, the job (B_job1) just having been selected as a transmission target and not having been registered in the image processing device as a transmission destination is located in the updated job list (FIG. 14) between the jobs ("MFP2-job1" and "MFP2-job2") already registered in the image processing device as the transfer destination.

In FIG. 14, the estimated start time of each of the jobs "MFP2-job1" and "MFP2-job2" has been updated. CPU 10 can calculate and display the estimated start time (and/or the estimated finish time) of each job based on data on each job displayed in the updated list.

That is, in the system of the present embodiment, when a job is transmitted to and executed in another image processing device, the order of execution of the transmitted job is not necessarily at the end in that image processing device as the transmission destination.

Based on information on a job selected as a transmission target such as the estimated start time in the image processing device as the transfer destination as shown in FIG. 14, the user makes a final determination as to whether or not to transmit the job. If finally determined that the job is to be transmitted, a transfer button 168 displayed in display section 150 of FIG. 14 is pressed. CPU 10 thereby determines in step S190 that job transmission is to be performed, and advances the process into step S200.

Here, when a return button 169 shown in FIG. 14 is operated, CPU 10 returns the process to step S150, and receives indication of another image processing device as a transfer destination.

In step S200, CPU 10 transfers job data of the job selected as the transmission target to the image processing device indicated as the transfer destination. In that image processing device, the selected job is thus added to the list of waiting jobs (job list).

Then, in step S210, CPU 10 deletes the job data of the transferred job from memory 16, and advances the process into step S220.

In step S220, CPU 10 determines whether or not all the jobs selected as transmission targets have been transferred in step S200 and have been deleted from memory 16 in step S210, and continues processing in steps S180 to step S210 until it is determined YES.

In the present embodiment, when a plurality of jobs are selected as transmission targets in MFP 10, the jobs can be transferred to image processing devices different from one another by executing steps S180 to step S210 for each job.

Moreover, in the present embodiment, the report on job transmission by mail transmission executed in step S130 may be executed on the condition that the job has actually been transferred in step S200. Alternatively, in addition to the report in step S130, a report on the condition of job transfer in step S200 may be executed again.

Second Embodiment

<System Configuration>

Basically, the configuration of an information transmission system of the present embodiment can be similar to that of the information transmission system of the first embodiment. Therefore, detailed description thereof will not be repeated.

In the present embodiment, transmission of a job registered in MFP 100 to another image processing device such as MFP 200 is controlled by an information processing device capable of communicating with MFP 100.

Moreover, as shown in FIGS. 15A and 15B, the information processing device of the present embodiment is implemented by an operation panel 15A that can be attached/detached to/from MFP 100. FIG. 15A shows the state where operation panel 15A is attached to MFP 100. FIG. 15B shows the state where operation panel 15A has been detached from MFP 100. MFP 100 has an outer surface formed with a recess into which operation panel 15A is to be fitted, as indicated by the broken line in FIG. 15B, for example. In MFP 100, the state where operation panel 15A is held by MFP 100 may be attained with operation panel 15A fitted within the recess.

<Configuration of MFP>

Figure 16:
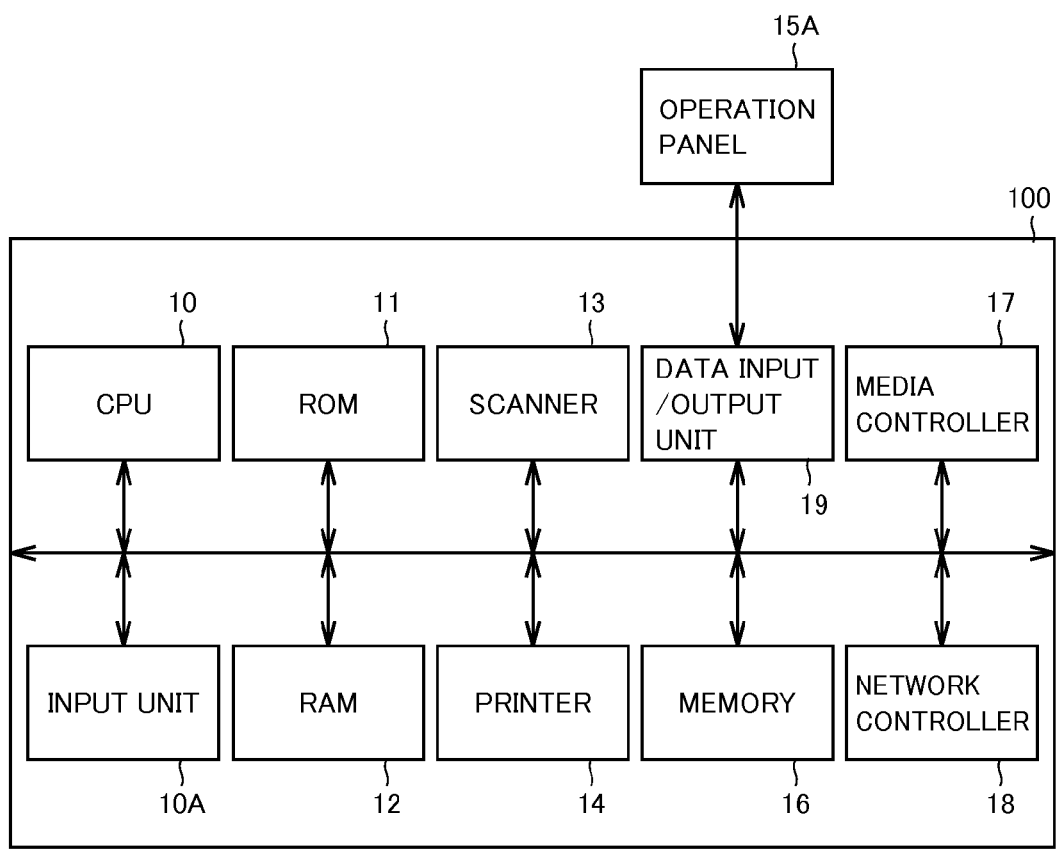
FIG. 16 shows a specific example of a hardware configuration of MFP of FIGS. 15A and 15B.

FIG. 16 shows a specific example of a hardware configuration of MFP 100 of the present embodiment. Referring to FIG. 16, MFP 100 of the present embodiment includes a data input/output unit 19 instead of operation panel 15, as compared with MFP 100 of the first embodiment. Data input/output unit 19 is implemented by an interface module that makes wireless communications with operation panel 15A of the present embodiment.

<Configuration of Operation Panel>

Figure 17:
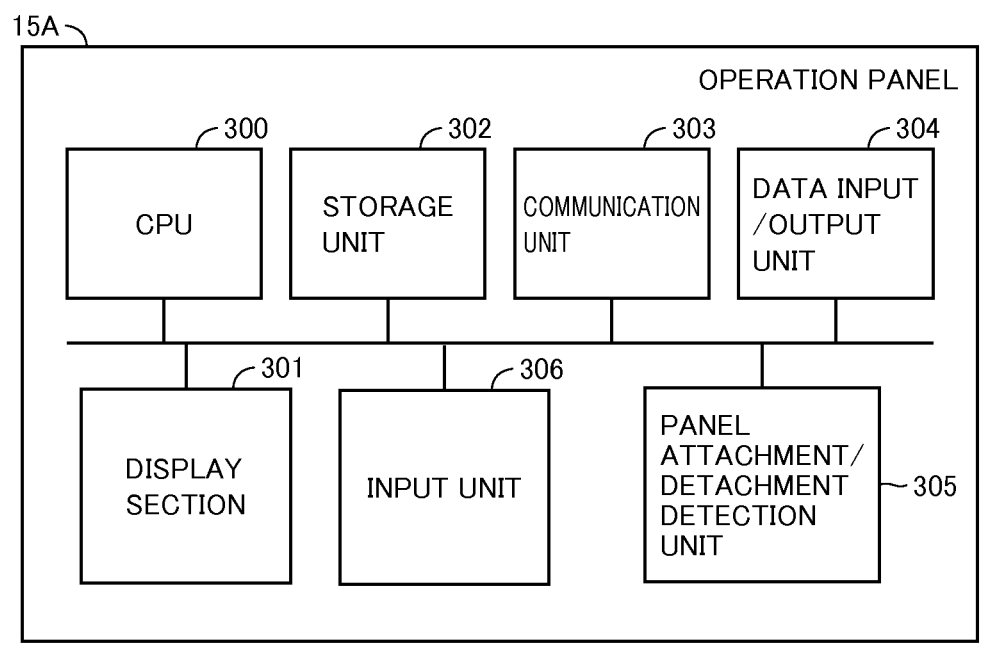
FIG. 17 shows a specific example of a hardware configuration of an operation panel of FIG. 15.

FIG. 17 shows a specific example of a hardware configuration of operation panel 15A of the present embodiment. Referring to FIG. 17, operation panel 15A includes a CPU 300 as an arithmetic unit for controlling operation panel 15A as a whole, a storage unit 302 for storing programs and the like to be executed by CPU 300, a communication unit 303 implemented by a modem or the like for communicating with another device through a network, a data input/output unit 304 for making wireless communications with MFP 100, a display section 301 implemented by a liquid crystal display device or the like, an input unit 306 implemented by a touch sensor or the like, and a panel attachment/detachment detection unit 305.

The touch panel may be implemented by display section 301 and input unit 306.

Examples of storage unit 302 include storage media that store programs in a nonvolatile manner, such as a CD-ROM, a DVD-ROM, a USB memory, a memory card, an FD, a hard disk, a magnetic tape, a cassette tape, an MO, an MD, an IC card (excluding a memory card), an optical card, a mask ROM, an EPROM, and an EEPROM.

Panel attachment/detachment detection unit 305 detects whether operation panel 15A is in the state attached to MFP 100 as shown in FIG. 15A or whether it is in the state detached from MFP 100 as shown in FIG. 15B. Panel attachment/detachment detection unit 305 is implemented by, for example, a switch to be pressed by a projection provided on the outer surface of MFP 100. In this case, panel attachment/detachment detection unit 305 outputs different signals depending on whether or not the switch is in the pressed state. CPU 300 determines whether operation panel 15A is attached to MFP 100 or not based on the details of a signal output from panel attachment/detachment detection unit 305. The configuration of panel attachment/detachment detection unit 305 is not limited to this, but commonly used, well-known means for identifying whether or not a predetermined component is attached to another component can be adopted.

<Functional Configuration>

FIG. 28 schematically shows a functional configuration of MFP 100 and operation panel 15A of the present embodiment.

MFP 100 includes a receiving unit 100A receiving input of information by a user operation, information communications from an external device or the like, an authentication unit 100B executing processing for user authentication, a storage unit 100C storing various types of data such as job data, a transfer unit 100D for transferring a job stored in storage unit 100C to another device, and an image processing unit 100E executing the job stored in storage unit 100C. Transfer unit 100D of the present embodiment can also be implemented by data input/output unit 19.

Operation panel 15A includes a receiving unit 1500A receiving input of information by a user operation, information communications from an external device or the like, an authentication unit 1500B executing processing for user authentication, a storage unit 1500C storing various types of data such as job data, and a transfer unit 1500D for transferring a job stored in storage unit 1500C to another device.

Receiving unit 1500A is implemented, for example, by input unit 306. Authentication unit 1500B is implemented, for example, by CPU 300 executing a program as appropriate. Storage unit 1500C is implemented, for example, by storage unit 302. Transfer unit 1500D is implemented, for example, by communication unit 303 and data input/output unit 304.

In the present embodiment, receiving unit 1500A of operation panel 15A receives input of an instruction to transfer a job registered in MFP 100. Upon receipt of that instruction, receiving unit 1500A instructs MFP 100 to transfer the job to an indicated transfer destination or to transfer the job to operation panel 15A. When job transfer to MFP 100 is instructed, operation panel 15A transfers the transferred job to a transfer destination having been received by receiving unit 1500A.

<Data>

MFP 100 of the present embodiment also has registered therein the job data (Table 1), the job list (Table 2) and the user list (Table 3).

In the present embodiment, the user list may also be registered in storage unit 302 of operation panel 15A. On operation panel 15A, user authentication may be executed as will be described later. The user authentication may be executed by using the user list registered in storage unit 302, or may be executed by reading the user list registered in memory 16 of MFP 100.

<Job Transmission Processing>

Figure 18:
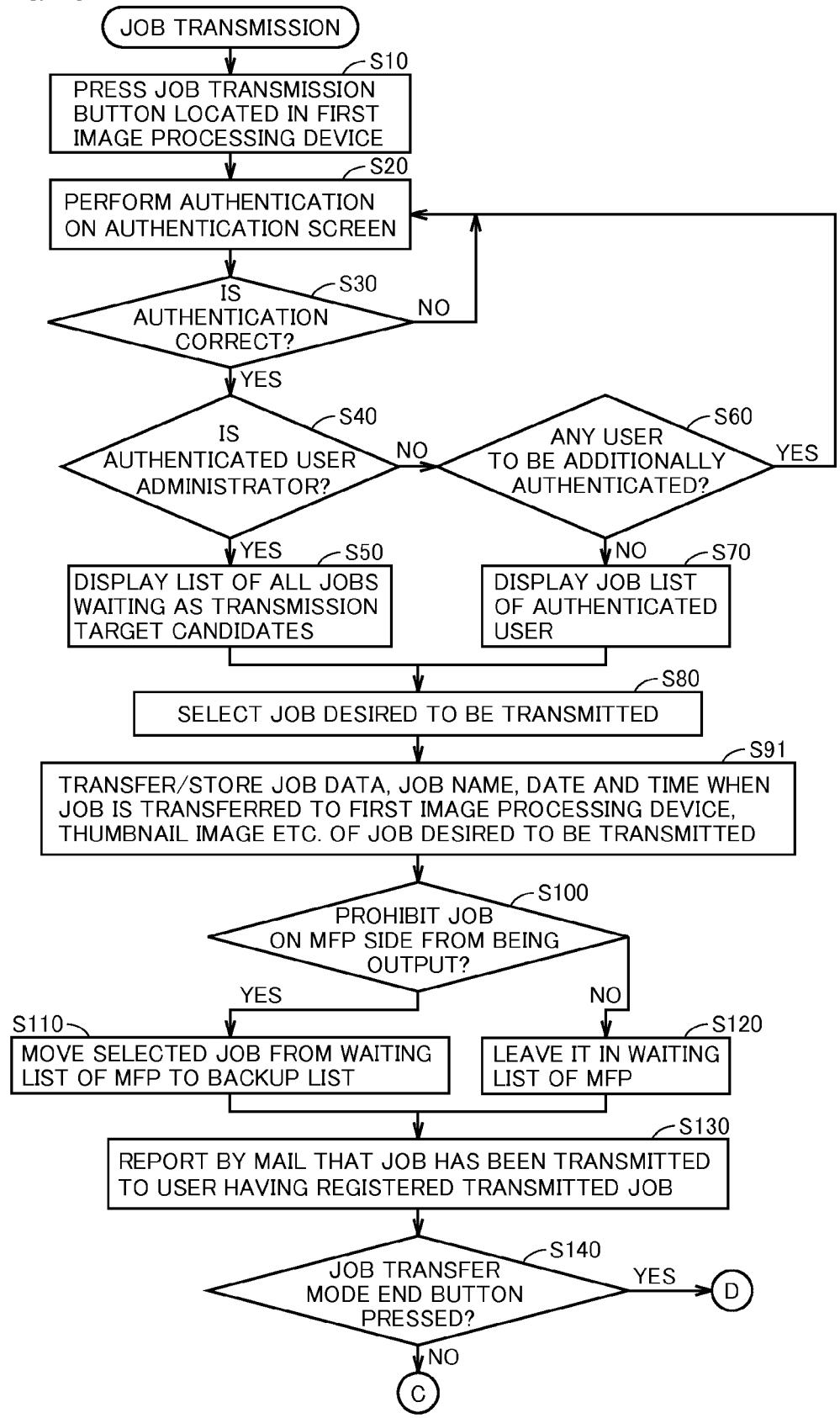
FIGS. 18 and 19 are flow charts of job transmission processing in the second embodiment.
Figure 19:
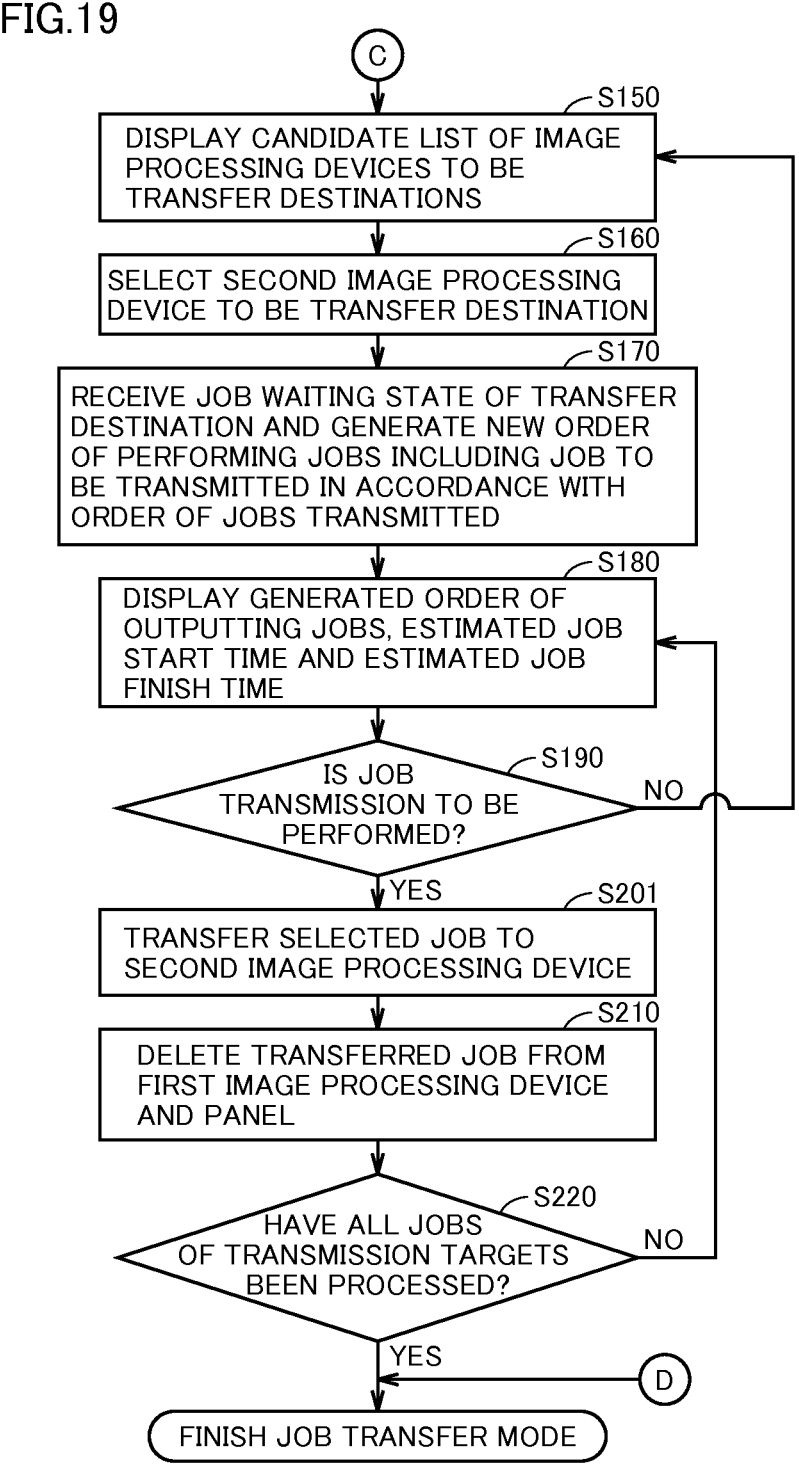

In the information transmission system of the present embodiment, when a trouble such as jam or failure occurs in MFP 100, a job registered in MFP 100 can be transmitted to another image processing device (MFP 200 or the like) by operating operation panel 15A. FIGS. 18 and 19 are flow charts of job transmission processing executed in the present embodiment. The details of job transmission processing will be described mainly referring to FIGS. 18 and 19.

The details of display on operation panel 15A in the job transmission processing of the present embodiment can be similar to the details of display on operation panel 15 of the first embodiment. Therefore, in the present specification, the details of display on operation panel 15A will be described as appropriate with reference to the details of display on operation panel 15 in the first embodiment.

First, the appearance of operation panel 15A can be similar to that of operation panel 15 in the first embodiment as shown in FIG. 6. That is, the list of jobs registered in MFP 100 as shown in display box 159 in FIG. 6 is displayed in a display section (display section 301) of operation panel 15A. CPU 300 obtains the job list of MFP 100 from MFP 100, thereby displaying the above-described list of jobs.

Then, when a button corresponding to button 151 of FIG. 6 is operated on operation panel 15A (step S10), CPU 300 advances the process into step S20.

In step S20, CPU 300 causes display section 301 to display the screen as shown in FIG. 7 for performing user authentication. CPU 300 then determines whether or not information for authentication having been entered is correct based on the user list (Table 2). The user list as used herein may be stored in storage unit 302, may be obtained by reading from memory 16 and downloading from MFP 100, or by reading/downloading a list registered in a server not shown. If determined that the information for authentication is not correct (NO in step S30), CPU 300 returns the process to step S20.

If determined that the information for authentication is correct (NO in step S30), CPU 300 advances the process into step S40.

In step S40, CPU 300 determines whether or not the type of an authenticated user is an administrator (Table 3), and if determined that he/she is an administrator, advances the process into step S50. If determined that he/she is not an administrator (public user), the process is advanced into step S60.

In step S60, CPU 300 determines whether or not authentication of another user is further performed. If determined that authentication is to be performed, the process is returned to step S20. If determined that authentication is not to be performed, the process is advanced into step S70.

In step S70, among the jobs registered in the job list of MFP 100, jobs of all the users having been authenticated so far are extracted and displayed. Then, CPU 300 advances the process into step S80.

On the other hand, in step S50, after reporting that an authenticated user is an administrator, CPU 300 causes all the jobs registered in the job list of MFP 100 to be displayed as transmission target candidates, and advances the process into step S80.

In step S80, CPU 300 receives input of information of selecting jobs desired to be transmitted from among the transmission target candidates displayed in step S50 or step S70, and advances the process into step S91.

In step S91, for the jobs selected in step S80 from among the jobs displayed as transmission target candidates, CPU 300 makes a request to MFP 100 for information registered in the job data, such as the job name, which is data excluding image data. In response to this, these pieces of information are sent from FMP 100 to operation panel 15A and are stored in storage unit 302. Then, the process is advanced into step S100.

In step S100, it is identified whether or not to set to prohibit MFP 100 from outputting the jobs selected in step S80. This identification is performed in accordance with the setting details entered on operation panel 15A by the user, for example. When it is set to prohibit MFP 100 from producing an output, CPU 300 advances the process into step S110, and when it is set to allow MFP 100 to produce an output, advances the process into step S120.

In step S110, CPU 300 removes information on the selected jobs from the job list of MFP 100 downloaded to storage unit 302, moves it to another list such as a backup list, and advances the process into step S130.

In step S120, CPU 300 advances the process into step S130 without making any change in the job list.

In step S130, CPU 300 reports transmission of the selected jobs by sending mail to the users of the respective jobs, and advances the process into step S140.

In step S140, CPU 300 determines whether or not an operation for terminating the job transmission processing has been performed. If determined that such an operation has been performed, CPU 300 terminates the job transmission processing. On the other hand, if determined that such an operation has not been performed, CPU 300 advances the process into step S150 (see FIG. 19).

In step S150, CPU 300 causes display section 301 to display the list of image processing devices to be transfer destinations (see FIG. 12), and advances the process into step S160.

Next, CPU 300 in step S160 selects one in the candidate list of image processing devices as transfer destinations displayed in step S150. That selection is made, for example, in accordance with details of a user operation on input unit 306.

Next, CPU 300 in step S170 causes display section 301 to display the order of performing jobs at the transfer destinations selected in step S160 (see FIG. 13). For displaying the order of performing jobs in step S170, CPU 300, by communicating with the image processing device selected in step S160 as the transfer destination, for example, obtains a job list in that image processing device.

Then, CPU 300 in step S180 causes the job selected as a transmission target to be added to and displayed in the job list (see FIG. 14).

Then, CPU 300 in step S190 makes a final determination as to whether or not to transmit the job selected as the transmission target, and if determined that it is to be transmitted, advances the process into step S201. On the other hand, when a final determination cannot be made (e.g., when return button 169 shown in FIG. 14 is operated), CPU 300 returns the process to step S150, and receives indication of another image processing device as a transfer destination.

In step S201, CPU 300 transfers job data of the job selected as the transmission target to the image processing device indicated as the transfer destination. In that image processing device, the selected job is thereby added to the list of waiting jobs (job list). The job transmission in step S201 may be performed using operation panel 15A, or may be performed without using operation panel 15A. The details will be described below assuming these two cases as the "former" and the "latter."

In the former case, in step S201, CPU 300 makes a request to MFP 100 for the job data of the job as the transmission target. In response to this, MFP 100 sends the above-described job data to operation panel 15A. The above-described job data is then stored in storage unit 302 of operation panel 15A. CPU 300 then sends the job data stored in storage unit 302 to the image processing device indicated as the transfer destination. The job transfer thus becomes possible even in such a case where MFP 100 cannot make direct communications with the image processing device indicated as the transfer destination. However, the request made by CPU 300 to MFP 100 for the job data or the like is preferably performed on the condition that panel attachment/detachment detection unit 305 has detected that operation panel 15A is in the state detached from MFP 100. When MFP 100 has operation panel 15A attached thereto, CPU 300 instructs MFP 100 to directly send the job or the like to the image processing device as the transfer destination, without downloading the job data or the like from MFP 100.

In the latter case, the job data is sent from MFP 100 to the image processing device indicated as the transfer destination. Storage unit 302 of operation panel 15A is thus not required to have a capacity that can store job data. Therefore, a reduction in the manufacturing cost of operation panel 15A and the like, can be achieved.

Then, in step S210, CPU 300 instructs MFP 100 to delete the job data of the transferred job from memory 16, and advances the process into step S220. When the job data has been stored in storage unit 302, that job data is deleted from storage unit 302 as well.

In step S220, CPU 300 determines whether or not all the jobs selected as transmission targets have been transferred in step S200 and have been deleted from memory 16 (and storage unit 302) in step S210, and continues processing in steps S180 to step S210 until it is determined YES.

Third Embodiment

<System Configuration>
Basically, the configuration of an information transmission system of the present embodiment can be similar to that of the information transmission system of the first embodiment. Therefore, detailed description thereof will not be repeated.

In the present embodiment, each image processing device (each of MFP 100 and MFP 200) has stored therein a count value of a counter defined for each user. Here, the count value is a value consumed when causing an image processing device to execute an image processing operation. That is, in the information transmission system of the present embodiment, a user has assigned thereto the remaining amount by which he/she can execute an image processing operation in each image processing device.

FIG. 20A shows an example of count values registered in memory 16 of MFP 100, and FIG. 20B shows an example of count values registered in memory 26 of MFP 200. As shown in both the examples of FIGS. 20A and 20B, the count value is registered for each user ID. In the present specification, the list of count values of users in the image processing device as shown in FIGS. 20A and 20B will also be referred to as a "counter list."

<Count Value Transmission Processing>
In the information transmission system of the present embodiment, the count value of a user stored for each image processing device can be transmitted between image processing devices. The details of processing for thus transmitting the count value (count value transmission processing) will be described below with reference to FIG. 21 showing a flow chart of that processing.

Referring to FIG. 21, first, CPU 10 in step SA10 receives an instruction to transmit the count value between image processing devices in the system. That instruction is achieved by, for example, execution of a specific operation on operation panel 15 or input unit 10A.

Next, CPU 10 in step SA20 receives an indication of an image processing device as a transmission source and an image processing device as a transmission destination for the count value in the information transmission system.

Figure 22:
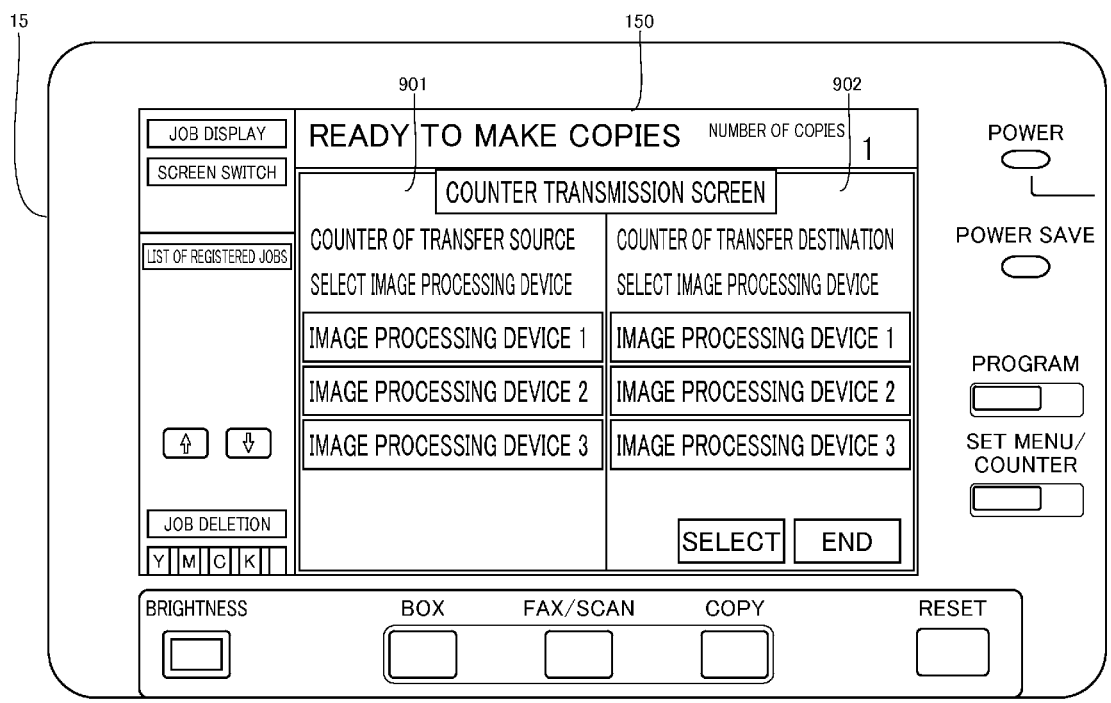
FIG. 22 shows an example of an appearance of an operation panel of MFP of the third embodiment.

On this occasion, a screen as shown in FIG. 22, for example, is displayed in display section 150 of operation panel 15. This screen includes a display box 901 in which an indication of an image processing device as a transmission source is to be entered, and a display box 902 in which an indication of an image processing device as a transmission destination is to be entered. For example, the names of all image processing devices with which CPU 10 can communicate (image processing devices 1 to 3) and the name of its own device are displayed in display boxes 901 and 902. The user makes a selection on the display, thereby entering information that indicates an image processing device as a transmission source and an image processing device as a transmission destination into MFP 100.

Next, in step SA30, CPU 10 causes display section 150 to display a screen as shown in FIG. 7 for performing user authentication. Then, it is determined in step SA40 whether or not the information for authentication having been entered is correct based on the user list (Table 2). If determined that the information for authentication is not correct (NO in step SA40), CPU 10 returns the process into step SA30.

If determined that the information for authentication is correct (YES in step SA40), CPU 10 advances the process into step SA50.

Figure 23:
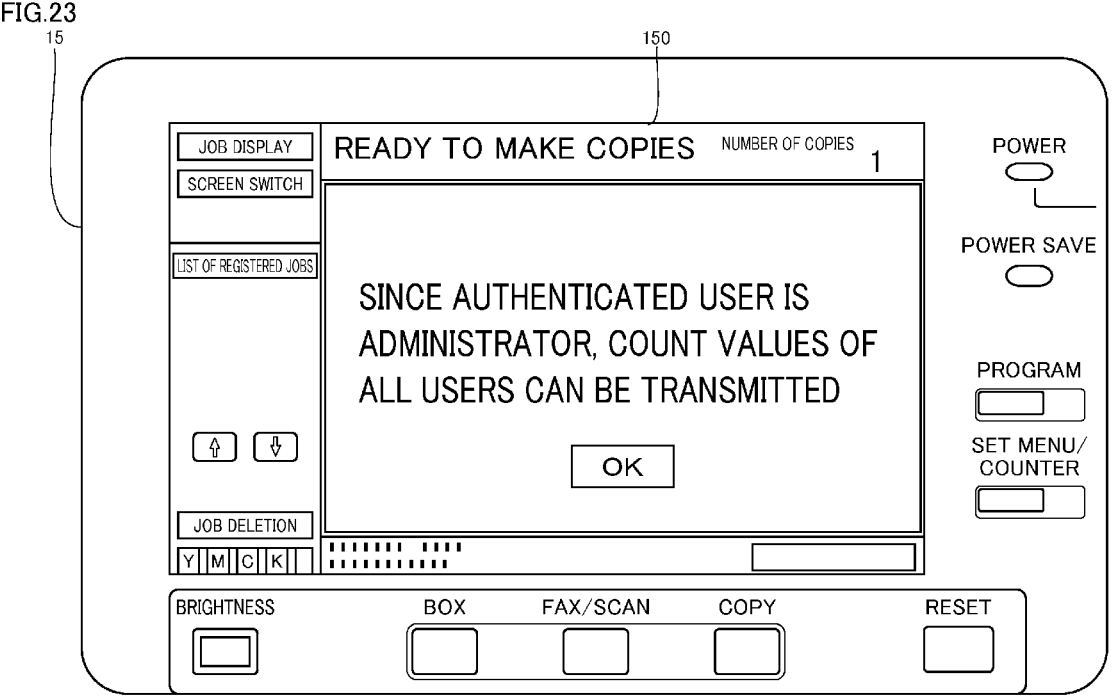
FIGS. 23 to 26 each show an example of an appearance of the operation panel of MFP of the third embodiment.

In step SA50, CPU 10 determines whether or not the type of an authenticated user is an administrator (Table 3), and If he/she is an administrator, causes display section 150 to display a message reporting to that effect ("SINCE AUTHENTICATED USER IS ADMINISTRATOR, COUNT VALUES OF ALL USERS CAN BE TRANSMITTED") as shown in FIG. 23, and then advances the process into step SA60. If determined that the user is not an administrator (public user), the process is advanced into step SA70.

In step SA70, CPU 10 determines whether or not authentication of another user is further performed, and if determined that authentication is to be performed, returns the process to step SA30, and if determined that authentication is not to be performed, advances the process into step SA80.

In step SA80, the count values of all the users having been authenticated so far are extracted from the counter list of the image processing device as a transmission source and the image processing device as a transmission destination whose indication has been received in step SA20 and displayed. That is, in step SA80, the counter list of the authenticated users for the image processing device as a transmission source and the image processing device as a transmission destination is displayed. Then, CPU 10 advances the process into step SA90.

On the other hand, in step SA60, CPU 10 causes display section 150 to display the count values for all the users registered in the counter list of the image processing devices indicated as the transmission source and the transmission destination in step SA20, and advances the process into step SA90.

Figure 24:
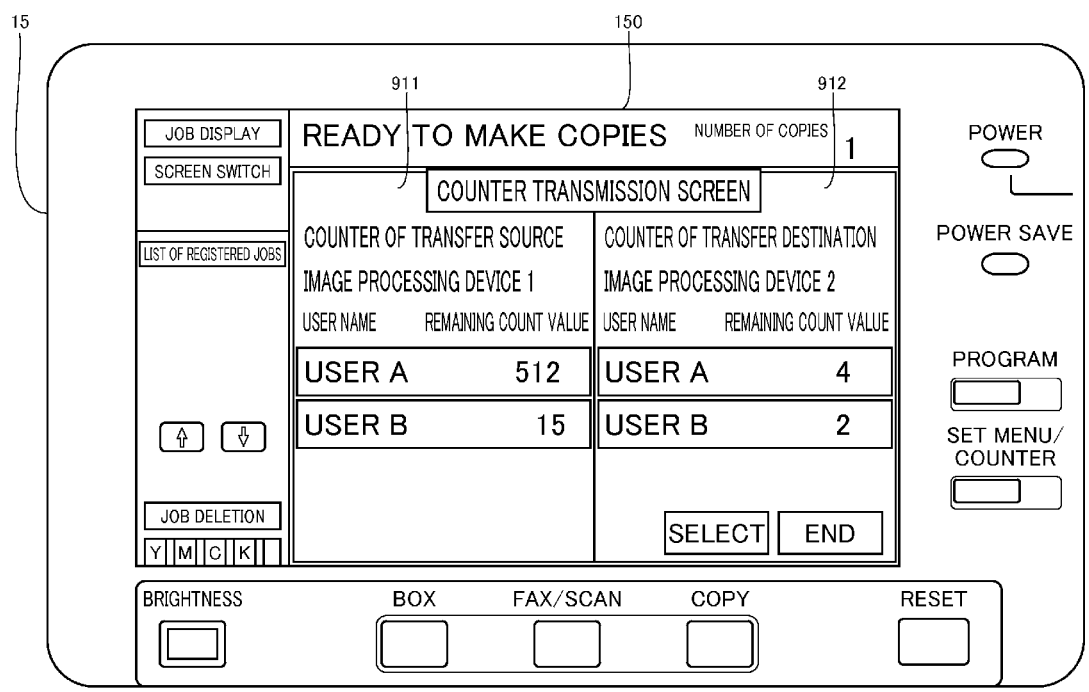

FIG. 24 shows an example of display of count values. Displayed in display section 150 of FIG. 24 are a display box 911 in which the count value of the counter of the image processing device as the transmission source is displayed, and a display box 912 in which the count value of the counter of the image processing device as the transmission destination is displayed. In FIG. 24, the transmission source is shown as a "transfer source", and the image processing device as the transmission source is shown as "image processing device 1." Moreover, in FIG. 24, the transmission destination is shown as a "transfer destination", and the image processing device as the transmission destination is shown as "image processing device 2."

The example of FIG. 24 shows the case where two users (A and B) have been authenticated in step SA30 to step S70. That is, the count values of the two users (A and B) are shown in display boxes 911 and 912.

Referring back to FIG. 21, CPU 10 in step SA90 receives a selection of users whose count values are to be transmitted in each of the image processing device as the transmission source and the image processing device as the transmission destination, and advances the process into step SA100. The selection is achieved, for example, by touching icons corresponding to the users whose count values are displayed in display boxes 911 and 912.

Figure 25:
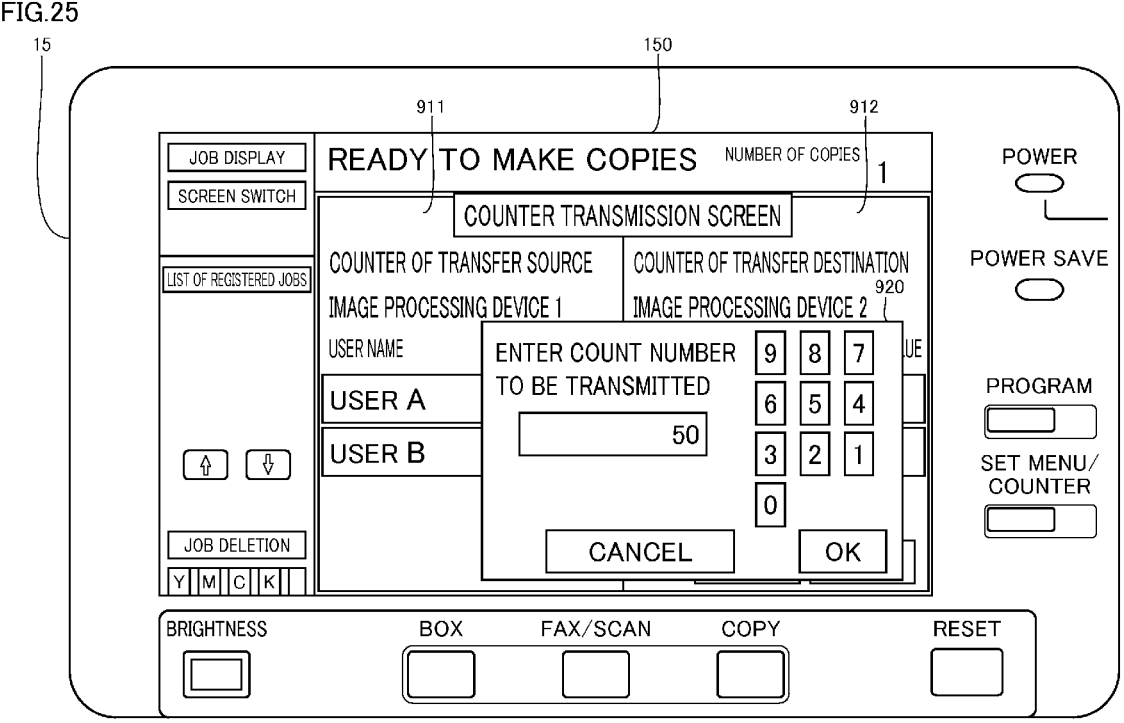

In step SA100, CPU 10 receives input of count numbers to be transmitted, and advances the process into step SA110. FIG. 25 shows an example of a screen displayed on operation panel 15 for receiving input of the count number in step SA100.

Referring to FIG. 25, a display box 920 in which the count value is to be entered is displayed in display section 150. A user enters the count number he/she wants to transmit by, for example, touching a numeric keypad in display box 920.

Referring back to FIG. 21, CPU 10 in step SA110 causes the count value entered in step SA100 to be transmitted, and terminates the process. Specifically, in the image processing device as the transmission source and the image processing device as the transmission destination selected in step SA20, the count values of the counters for the users of the transmission source and the transmission destination selected in step SA90 are updated so as to increase or decrease by the number whose entry has been received in step SA100.

For example, in the case where MFP 100 has been selected (entered) as the image processing device as the transmission source, MFP 200 has been selected (entered) as the image processing device as the transmission destination, "user A" has been selected (entered) as a user of the transmission source, "user B" has been selected (entered) as a user of the transmission destination, and "50" has been selected (entered) as the count number, the count values of the counters shown in FIGS. 20A and 20B are updated as shown in FIGS. 29A and 29B.

Figure 26:
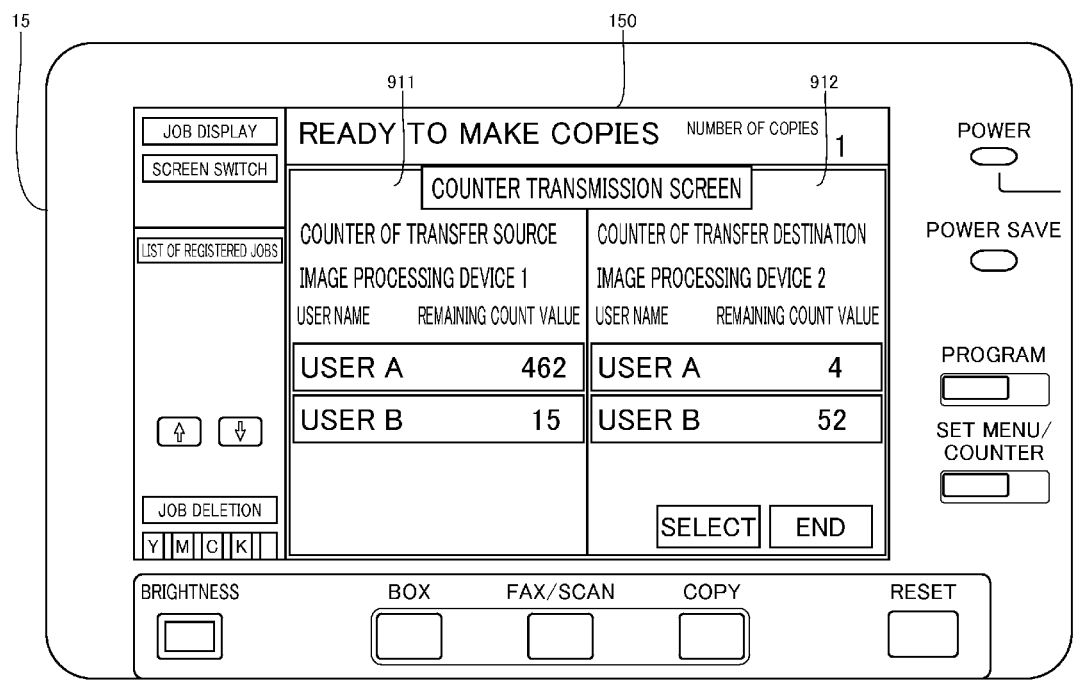

Accordingly, the display on operation panel 15 is also updated as shown in FIG. 26. The updated count value for each user is shown in display boxes 911 and 912 of FIG. 26, as compared with display boxes 911 and 912 of FIG. 24.

In the counter of MFP 100 shown in FIG. 29A, the count value of user A who is a user of the transmission source has been reduced by 50 as compared with the counter of FIG. 20A. On the other hand, in the counter of MFP 200 shown in FIG. 29B, the count value of user B who is a user of the transmission destination has been increased by 50 as compared with the counter of FIG. 20B.

In the information transmission system, the counters of respective users in each image processing device may be managed collectively in a server. In such a case, CPU 10 in step SA110 requests the server to update each counter. In response to this, the server updates each counter.

[Other Variations, Etc.]

In the respective embodiments described above, some or all pieces of information associated with each user (job, count value of counter, etc.) stored in the first image processing device (MFP 100) are transmitted to the second image processing device (MFP 200 or the like). The operation for transmitting information basically needs to be performed by a user having registered that information. In order to perform the operation, each user needs to be subjected to authentication. According to the technique described in each embodiment, if a plurality of users are authenticated at the beginning of processing, transmission of information on the plurality of users can be performed collectively (steps S70, S80, steps SA80, SA90). This eliminates the need to execute processing of indicating information to be transmitted for each user, which can facilitate the operation for entering an instruction to transmit information.

When a user among the plurality of users having been authenticated representatively performs a subsequent operation for transmission, reports by mail or the like are sent to the other users in step S130 or the like so as to report the details of information transmission reliably.

If the authenticated user is an "administrator", he/she can perform the processing for transmitting information on all the users even under the situation where only one user has been authenticated (step S50 and step SA60).

In the third embodiment, the count value of the counter, such as a copy counter, has been mentioned as information for each user. In the third embodiment, an instruction to update the counter is provided from a certain image processing device to another image processing device following transmission of the count value. Such an instruction may be provided through an information processing device (e.g., an operation panel that can be attached/detached to/from MFP), as described in the second embodiment. In this case, the information processing device may obtain the counters from the image processing device as the transmission source and the image processing device as the transmission destination, and may update each counter in accordance with a user instruction to transmit the count value. Then, the information processing device sends an updated counter to each image processing device. In each image processing device, the counter is thereby updated to that received from the information processing device.

According to the respective embodiments described above, the receiving means can receive an instruction to transmit information associated with the respective users authenticated by the authentication means.

Therefore, if all the users associated with the information to be transmitted have been authenticated by the authentication means, the receiving means can collectively receive an instruction to transmit information associated with the respective users.

The operation for entering an instruction to transmit information is thereby facilitated.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information transmission system comprising:
a first image processing device configured to include a memory for storing information associated with each user; and
a second image processing device,
said information transmission system further comprising:
an authentication unit configured to authenticate a user;
a receiving unit configured to receive an instruction for identifying information to be transmitted to said second image processing device, from said information associated with the user authenticated by said authentication unit; and
a transmission unit configured to transmit said information identified by the instruction received by said receiving unit, from said first image processing device to said second image processing device,
said authentication unit being configured to authenticate a second user with a first user having been authenticated, and
said receiving unit being configured to receive the instruction for identifying said information from information associated with the first user authenticated by said authentication unit and information associated with the second user authenticated by said authentication unit.

2. The information transmission system according to claim 1, wherein said first image processing device includes said authentication unit, said receiving unit and said transmission unit.

3. The information transmission system according to claim 1, further comprising an information processing device that can communicate with said first image processing device and that can be attached/detached to/from said first image processing device, wherein said information processing device includes said authentication unit, said receiving unit and said transmission unit.

4. The information transmission system according to claim 3, wherein
said information processing device includes a storage device, and
said transmission unit stores, in said storage device, said information identified by the instruction received by said receiving unit, and then transmits said information to said second image processing device.

5. The information transmission system according to claim 1, wherein said information is job data output from an image processing device.

6. The information transmission system according to claim 1, wherein said information is a count value of a counter consumed by an image processing operation.

7. The information transmission system according to claim 1, wherein when a specific user is authenticated by said authentication unit, said receiving unit receives the instruction for identifying said information from information associated with a plurality of users corresponding to the specific user.

8. A method for transmitting information in an information transmission system comprising a first image processing device and a second image processing device, the method comprising:
storing, by said first image processing device, information associated with each user;
authenticating a user;
receiving an instruction for identifying information to be transmitted to said second image processing device, from said information associated with the authenticated user; and
transmitting said information identified by the instruction received, from said first image processing device to said second image processing device, wherein
said authenticating includes authenticating a second user with a first user having been authenticated, and
said receiving an instruction for identifying information to be transmitted to said second image processing device includes receiving the instruction for identifying said information from information associated with the first user authenticated and information associated with the second user authenticated.

9. The method according to claim 8, wherein said first image processing device executes said authenticating a user, said receiving an instruction for identifying information to be transmitted to said second image processing device, and said transmitting said information.

10. The method according to claim 8, wherein said information transmission system further comprises an information processing device that can communicate with said first image processing device and that can be attached/detached to/from said first image processing device, and
said information processing device includes said authenticating a user, said receiving an instruction for identifying information to be transmitted to said second image processing device, and said transmitting said information.

11. The method according to claim 10, wherein
said information processing device includes a storage device, and
said transmitting said information includes storing, in said storage device, said information identified by the instruction received, before transmitting said information to said second image processing device.

12. The method according to claim 8, wherein said information is job data output from an image processing device.

13. The method according to claim 8, wherein said information is a count value of a counter consumed by an image processing operation.

14. The method according to claim 8, wherein when a specific user is authenticated, said receiving an instruction for identifying information to be transmitted to said second image processing device includes receiving the instruction for identifying said information, from information associated with a plurality of users corresponding to the specific user.

* * * * *